(12) United States Patent
Kim et al.

(10) Patent No.: US 12,476,277 B2
(45) Date of Patent: *Nov. 18, 2025

(54) SOLID ELECTROLYTE, METHOD OF PREPARING THE SAME, AND LITHIUM BATTERY INCLUDING THE SOLID ELECTROLYTE

(71) Applicants: Samsung Electronics Co., Ltd., Suwon-si (KR); CORNING INCORPORATED, Corning, NY (US)

(72) Inventors: Jusik Kim, Suwon-si (KR); Michael Edward Badding, Corning, NY (US); Hyunseok Kim, Suwon-si (KR); Zhen Song, Corning, NY (US); Taehwan Yu, Seoul (KR)

(73) Assignees: SAMSUNG ELECTRONICS CO., LTD., Gyeonggi-Do (KR); CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/666,804

(22) Filed: Feb. 8, 2022

(65) Prior Publication Data

US 2022/0166062 A1 May 26, 2022

Related U.S. Application Data

(63) Continuation of application No. 16/052,743, filed on Aug. 2, 2018, now Pat. No. 11,276,879.

(30) Foreign Application Priority Data

Aug. 4, 2017 (KR) ........................ 10-2017-0099079
Aug. 1, 2018 (KR) ........................ 10-2018-0090059

(51) Int. Cl.
*H01M 10/0562* (2010.01)
*H01M 4/02* (2006.01)
(Continued)

(52) U.S. Cl.
CPC ....... *H01M 10/0562* (2013.01); *H01M 4/382* (2013.01); *H01M 4/405* (2013.01);
(Continued)

(58) Field of Classification Search
CPC ........... H01M 10/052; H01M 10/0525; H01M 10/0562; H01M 10/0564; H01M 10/058;
(Continued)

(56) References Cited

U.S. PATENT DOCUMENTS 4,357,215 A 11/1982 Goodenough et al.
7,513,136 B2 4/2009 Laliberte et al.
(Continued)

FOREIGN PATENT DOCUMENTS

CN 104321914 A 1/2015
CN 104916869 A 9/2015
(Continued)

OTHER PUBLICATIONS

Japanese Office Action for Japanese Patent Application No. 2018-147491 dated Sep. 20, 2022.
(Continued)

*Primary Examiner* — Miriam Stagg
*Assistant Examiner* — Lilia Nedialkova
(74) *Attorney, Agent, or Firm* — CANTOR COLBURN LLP

(57) ABSTRACT

A solid electrolyte including: a lithium ion inorganic conductive layer; and an amorphous phase on a surface of the lithium ion inorganic conductive layer, wherein the amorphous phase is an irradiation product of the lithium ion inorganic conductive layer. Also, the method of preparing the same, and a lithium battery including the solid electrolyte.

42 Claims, 18 Drawing Sheets

(51) Int. Cl.
*H01M 4/38* (2006.01)
*H01M 4/40* (2006.01)
*H01M 10/052* (2010.01)
*H01M 10/0525* (2010.01)
*H01M 10/0564* (2010.01)
*H01M 10/058* (2010.01)
*H01M 50/403* (2021.01)
*H01M 50/431* (2021.01)

(52) U.S. Cl.
CPC ..... *H01M 10/052* (2013.01); *H01M 10/0525* (2013.01); *H01M 10/0564* (2013.01); *H01M 10/058* (2013.01); *H01M 50/403* (2021.01); *H01M 50/431* (2021.01); *H01M 2004/027* (2013.01); *H01M 2300/0068* (2013.01); *H01M 2300/0077* (2013.01); *H01M 2300/0094* (2013.01)

(58) Field of Classification Search
CPC .... H01M 4/382; H01M 4/405; H01M 50/403; H01M 50/431; H01M 2300/0068; H01M 2300/0077; H01M 2300/0094; H01M 2004/027; Y02E 60/10; Y02P 70/50
See application file for complete search history.

(56) References Cited

U.S. PATENT DOCUMENTS

| | | | |
|---|---|---|---|
| 7,531,012 B2 | 5/2009 | Sudano et al. | |
| 7,547,492 B2 | 6/2009 | Awano et al. | |
| 7,682,733 B2* | 3/2010 | Eisenbeiser | H01M 10/0562 29/623.5 |
| 7,968,224 B2 | 6/2011 | Sudano et al. | |
| 9,356,313 B2 | 5/2016 | Oukassi et al. | |
| 10,784,534 B2 | 9/2020 | Yokoyama et al. | |
| 10,862,162 B2 | 12/2020 | Teraoka et al. | |
| 10,947,160 B2 | 3/2021 | Yamamoto et al. | |
| 2004/0023106 A1* | 2/2004 | Benson | H01M 10/0436 429/126 |
| 2004/0151986 A1* | 8/2004 | Park | H01M 10/0436 501/134 |
| 2009/0202903 A1* | 8/2009 | Chiang | H01M 10/052 429/231.95 |
| 2009/0263725 A1 | 10/2009 | Balsara et al. | |
| 2011/0053001 A1 | 3/2011 | Babic et al. | |
| 2011/0206994 A1 | 8/2011 | Balsara et al. | |
| 2011/0281173 A1 | 11/2011 | Singh et al. | |
| 2014/0248541 A1 | 9/2014 | Oukassi et al. | |
| 2014/0308590 A1 | 10/2014 | Ohta et al. | |
| 2015/0180001 A1 | 6/2015 | Johnson et al. | |
| 2015/0255767 A1 | 9/2015 | Aetukuri et al. | |
| 2015/0333307 A1 | 11/2015 | Thokchom et al. | |
| 2016/0013515 A1 | 1/2016 | Lee et al. | |
| 2016/0064770 A1 | 3/2016 | Lee et al. | |
| 2016/0064772 A1 | 3/2016 | Choi et al. | |
| 2016/0064773 A1 | 3/2016 | Choi et al. | |
| 2016/0072148 A1 | 3/2016 | Lee et al. | |
| 2016/0087306 A1 | 3/2016 | Lee et al. | |
| 2016/0093916 A1 | 3/2016 | Moon et al. | |
| 2016/0233539 A1 | 8/2016 | Sastry et al. | |
| 2016/0248118 A1* | 8/2016 | Chan | D01D 5/0015 |
| 2016/0294005 A1 | 10/2016 | Lee et al. | |
| 2016/0308244 A1 | 10/2016 | Badding et al. | |
| 2016/0329567 A1 | 11/2016 | Lee et al. | |
| 2016/0329598 A1 | 11/2016 | Schneider et al. | |
| 2016/0336618 A1 | 11/2016 | Lee et al. | |
| 2016/0351956 A1 | 12/2016 | Lee et al. | |
| 2017/0062829 A1 | 3/2017 | Ryu et al. | |
| 2017/0149093 A1* | 5/2017 | Sun | H01M 10/0404 |
| 2017/0179472 A1 | 6/2017 | Allie et al. | |
| 2017/0237124 A1 | 8/2017 | Song et al. | |
| 2017/0317352 A1 | 11/2017 | Lee et al. | |
| 2017/0324097 A1 | 11/2017 | Lee et al. | |
| 2017/0338522 A1 | 11/2017 | Hu et al. | |
| 2018/0316051 A1 | 11/2018 | Lee et al. | |
| 2019/0097267 A1 | 3/2019 | Yokoyama et al. | |

FOREIGN PATENT DOCUMENTS

| | | |
|---|---|---|
| CN | 105390744 A | 3/2016 |
| CN | 106025348 A | 10/2016 |
| CN | 106663841 A | 5/2017 |
| CN | 107408721 A | 11/2017 |
| JP | 200859843 A | 3/2008 |
| JP | 2008103287 A | 5/2008 |
| JP | 2013109840 A | 6/2013 |
| JP | 2013229315 A | 11/2013 |
| JP | 2014002965 A | 1/2014 |
| JP | 2014220173 A | 11/2014 |
| JP | 5772533 B2 | 7/2015 |
| JP | 2015138741 A | 7/2015 |
| JP | 2015220011 A | 12/2015 |
| JP | 2017103253 A | 6/2017 |
| JP | 2017168395 A | 9/2017 |
| JP | 2017168396 A | 9/2017 |
| JP | 202017535 A | 1/2020 |
| KR | 20140031313 A | 3/2014 |
| KR | 20170070239 A | 6/2017 |
| WO | 2016033379 A1 | 3/2016 |
| WO | 2017159571 A1 | 9/2017 |

OTHER PUBLICATIONS

Broek et al, "Interface-Engineered All-Solid-State Li-Ion Batteries Based on Garnet-Type Fast Li+ Conductors", Advanced Energy Materials, 6, 2016, 1600736.

Cheng et al., "Intergranular Li metal propagation through cpolycrystalline Li6.25Al0.25La3Zr2O12 ceramic electrolyte", Electrochimica Acta 223, 2017, pp. 85-91.

Cheng et al., "The origin of high electrolyte-electrode interfacial resistances in lithium cells containing garnet type solid electrolyutes*", Phys. Chem. Chem. Phys., 16, 2014, p. 18294.

Han et al., "Negating interfacial impedance in garnet-based solid-state Li metal batteries", Nature Materials, 2016, pp. 1-9.

Hirose et al., "Glass-ceramics with LiFePO4 crystals and cystal line patterning in glass by YAG laser irradiation", Solid State Ionics, 178, 2007, pp. 801-807.

Kato et al., "In-situ Li7La3Zr2O12/LiCoO2 interface modification ofr advanced all-solid-state battery", Journal of Power Sources, 280, 2014, pp. 292-298.

Kim J-S, et al., "Origian of intergranular Li metal propagation in garnet-based solid elecrolyte by direct electronic structure analysis and performance improvement by bandgap engineering", Journal of Materials Chemistry A, vol. 8, p. 16892, published Jul. 17, 2020.

Manthiram et al., "Lithium battery chemistries enabled by solid-state electrolytes", Nature Reviews/Materials, vol. 2, No. 16103, 2017, pp. 1-16.

Murugan, R., et al., "Fast Lithium Ion Conduction in Garnet-Type Li7La3Zr2O12," Angew. Chem. Int. Ed., 46, 2007, pp. 7778-7781.

Sastre, J et al., "Blocking lithium dendrite growth in solid-state batteries with an ultrathin amorphous Li—La—Zr—O solid electrolyte", Communication Materials, vol. 2, p. 76 published Jul. 13, 2021.

Chinese Office Action for Chinese Patent Application No. 201810879748.1 dated Mar. 24, 2023.

Jan van den Broek et al., Interface-Engineered All-Solid-State Li-Ion Batteries Based on Garnet-Type Fast Li+ Conductors:, Adv. Energy Materials, Department of Materials, Wiley-VCH Verlag GmbH & Co., KGaA, Weinheim, 2016, pp. 1-11.

Korean Office Action for Korean Patent Application No. 10-2018-0090059 dated Jan. 25, 2024.

Yoon et al., "Preparation and Characterization of Ta-substituted Li7LA3Zr2-x012 Garnet Solid Electrolyte by Sol-Gel Processing", Journal of the Korean Ceramic Society, vol. 54, No. 4, 2017, pp. 278-284.

* cited by examiner

EDS Results

| Element | Weight % | Atomic % | Net Int. | Error % | Kratio | Z | R | A | F |
|---|---|---|---|---|---|---|---|---|---|
| C K | 10.95 | 31.41 | 16.42 | 12.97 | 0.07 | 1.43 | 0.82 | 0.42 | 1 |
| O K | 24.39 | 52.53 | 60.15 | 9.90 | 0.16 | 1.36 | 0.84 | 0.47 | 1 |
| ZrL | 11.77 | 4.45 | 18.71 | 16.05 | 0.10 | 0.9 | 1.06 | 0.93 | 1 |
| AuM | 20.60 | 3.60 | 26.43 | 13.88 | 0.17 | 0.73 | 1.2 | 1.07 | 1.05 |
| LaL | 32.29 | 8.01 | 9.21 | 39.51 | 0.25 | 0.76 | 1.07 | 1.01 | 1.01 |

EDS Results

| Element | Weight % | Atomic % | Net Int. | Error % | Kratio | Z | R | A | F |
|---|---|---|---|---|---|---|---|---|---|
| C K | 10.48 | 48.92 | 272.97 | 8.33 | 0.08 | 1.57 | 0.77 | 0.5 | 1 |
| W M | 3.49 | 1.42 | 52.49 | 12.59 | 0.03 | 0.86 | 1.1 | 0.88 | 1.15 |
| Zr L | 13.84 | 11.33 | 193.94 | 7.68 | 0.12 | 1.04 | 0.98 | 0.83 | 1.01 |
| Au M | 2.94 | 1.12 | 37.83 | 13.56 | 0.03 | 0.85 | 1.11 | 0.98 | 1.16 |
| La L | 69.24 | 37.22 | 201.00 | 11.22 | 0.64 | 0.91 | 1.03 | 1 | 1.02 |

SOLID ELECTROLYTE, METHOD OF PREPARING THE SAME, AND LITHIUM BATTERY INCLUDING THE SOLID ELECTROLYTE

CROSS-REFERENCE TO RELATED APPLICATION

This application is a continuation of U.S. patent application Ser. No. 16/052,743, and claims priority to and the benefit of Korean Patent Application Nos. 10-2017-0099079, filed on Aug. 4, 2017, and 10-2018-0090059, filed on Aug. 1, 2018, in the Korean Intellectual Property Office, and all the benefits therefrom under 35 U.S.C. § 119, the contents of which are incorporated herein in their entirety by reference.

BACKGROUND

1. Field

The present disclosure relates to a solid electrolyte, a method of preparing the same, and a lithium battery including the solid electrolyte.

2. Description of the Related Art

A solid electrolyte used in a lithium metal battery should have excellent ionic conductivity, be thermally stable, and be able to suppress a side reaction between an electrode and a solid electrolyte. Thus a solid electrolyte which is chemically and electro-chemically with respect to the electrode is desirable. Thus there remains a need for an improved solid electrolyte.

A lithium-lanthanum-zirconium oxide-based solid electrolyte does not, without further modification, have sufficient ionic conductivity due to high interfacial resistance with a lithium metal negative electrode. Also, and while not wanting to be bound by theory, it is understood that penetration of lithium dendrites-occurs at a grain boundary of the lithium-lanthanum-zirconium oxide-based film when a lithium metal battery is driven with a high current density. A solid electrolyte with improved ionic conductivity and resistant dendrite formation is needed.

SUMMARY

Provided are a solid electrolyte and a method of preparing the same.

Provided is a lithium battery including the solid electrolyte.

Additional aspects will be set forth in part in the description which follows and, in part, will be apparent from the description, or may be learned by practice of the presented embodiments.

According to an aspect, a solid electrolyte includes: a lithium ion inorganic conductive layer; and an amorphous phase on a surface of the lithium ion inorganic conductive layer, wherein the amorphous phase includes an irradiation product of the lithium ion inorganic conductive layer.

According to an aspect, a lithium battery includes a negative electrode; a positive electrode; and the solid electrolyte.

According to an aspect, a method of preparing a solid electrolyte includes: providing a lithium ion inorganic conductive layer; and irradiating the lithium ion inorganic conductive layer with a laser beam to form an amorphous phase on a surface of the lithium ion inorganic conductive layer to prepare the solid electrolyte.

According to an aspect, a solid electrolyte includes: a lithium ion conductive layer including a lithium ion conductive garnet; and an amorphous lithium-lanthanum-zirconium oxide (LLZO) on a surface of the lithium ion conductive layer.

BRIEF DESCRIPTION OF THE DRAWINGS

These and other aspects will become apparent and more readily appreciated from the following description of the embodiments, taken in conjunction with the accompanying drawings in which.

DETAILED DESCRIPTION

Figure 1:
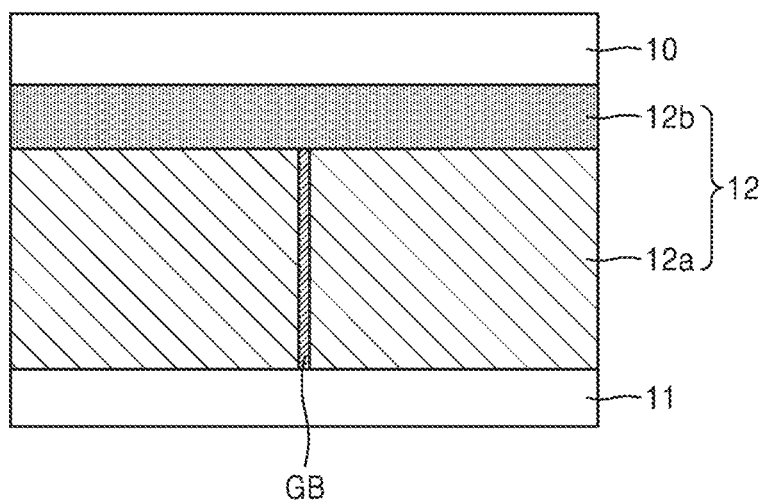
FIG. 1 is a schematic view illustrating a structure of an embodiment of a lithium battery including an electrolyte for a lithium metal battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects. Expressions such as "at least one of," when preceding a list of elements, modify the entire list of elements and do not modify the individual elements of the list. Also, "at least one" does not exclude like elements not named.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C rate means a current which will discharge a battery in one hour, e.g., a C rate for a battery having a discharge capacity of 1.6 ampere-hours would be 1.6 amperes.

Hereinafter, a solid electrolyte for a lithium battery according to an embodiment, a method of preparing the solid electrolyte, and a lithium battery including the solid electrolyte will be described in further detail.

According to an embodiment of the present disclosure, there is provided a solid electrolyte comprising a lithium ion inorganic conductive layer; and an amorphous phase on a surface of the lithium ion inorganic conductive layer. The amorphous phase comprises an irradiation product of the lithium ion inorganic conductive layer. In an embodiment the amorphous phase consists of an irradiation product of the lithium ion inorganic conductive layer. The amorphous phase may be in a form of an amorphous film, and the amorphous film may have a thickness of about 5 nanometers (nm) to about 5 micrometers (μm), about 10 nm to about 1 μm, or about 20 nm to about 500 nm. The solid electrolyte may further comprise a semi-crystalline film comprising a semi-crystalline phase, and the semi-crystalline film may be situated between the lithium ion inorganic conductive layer and the amorphous film. Also, the solid electrolyte may further comprise a crystalline phase situated between the semi-crystalline film and the amorphous film. The crystalline phase may be in the form of a crystalline film.

In an embodiment, the amorphous phase may be in a form of a patterned amorphous film. As such, when a pattern is formed on a surface of the amorphous film to prepare a patterned amorphous film, the patterned amorphous film may have a surface area which is about 200 to about 500 percent (%) greater than a surface area of the lithium ion inorganic conductive layer, e.g., the lithium ion inorganic conductive layer beneath the patterned amorphous film. When a surface area of the solid electrolyte increases, an activation area between the solid electrolyte and a lithium metal negative electrode accordingly increases, thereby reducing interfacial resistance between the solid electrolyte and the lithium metal negative electrode. Thus, when a solid electrolyte is disposed to be adjacent to at least one of a negative electrode and a positive electrode, the effect of reducing interfacial resistance between the solid electrolyte and the at least one of a negative electrode and a positive electrode can be obtained. In an embodiment, the patterned amorphous film has a surface area which is about 250 to about 450%, or about 300 to about 400% greater than a surface area of the lithium ion inorganic conductive layer.

As an example of a solid electrolyte used in a lithium battery, a lithium-lanthanum-zirconium oxide-based film may be used. However, when the lithium-lanthanum-zirconium oxide-based film is used as a solid electrolyte, interfacial resistance between the solid electrolyte and a lithium metal negative electrode increases so that the solid electrolyte may not have sufficient ion conductivity. In particular, when a lithium metal battery is driven with a high current density, lithium ions may penetrate the grain boundary of the solid electrolyte and grow therein, to cause a short circuit of the lithium battery.

In this regard, the inventors of the present disclosure have studied and found that an amorphous film may be disposed on a side of a lithium ion inorganic conductive layer constituting a solid electrolyte to provide a solid electrolyte in which penetration of lithium ions into the grain boundary of the lithium-lanthanum-zirconium oxide-based film and growth of lithium ions therein are suppressed. The amorphous film may be disposed on both sides of the lithium ion inorganic conductive film. In an embodiment, the amorphous film of the solid electrolyte may be disposed to be adjacent to at least one of a positive electrode and a negative electrode during manufacture of a lithium metal battery. In addition, the amorphous film may be formed in the shape of a pattern.

As described above, when the lithium ion inorganic conductive layer includes an amorphous phase on a surface thereof, the effect of removing the grain boundary from the surface of the solid electrolyte may be obtained. In addition, as the growth of lithium metal or propagation of lithium ions into the solid electrolyte is suppressed, a short circuit caused by lithium metal may be prevented during a charge/discharge process.

When the solid electrolyte according to an embodiment is used, the interfacial resistance between the solid electrolyte and lithium metal is reduced, resulting in improved rate performance of a battery including the solid electrolyte. Also, because the occurrence of a short circuit caused by lithium is suppressed, the lithium battery has an improved lifespan.

The amorphous phase may be formed by irradiating a laser beam onto the lithium ion inorganic conductive layer. When the lithium ion inorganic conductive layer is irradiated with a laser beam, an amorphous phase may be formed on a surface of the lithium ion inorganic conductive layer and a surface of the amorphous phase may be physically etched. The amorphous phase may be in the form on an amorphous film on the lithium ion inorganic conductive layer.

Without further modification, lithium-lanthanum-zirconium oxide (LLZO) surfaces are unstable in ambient atmosphere and can form a resistive layer of lithium carbonate on the surface, and the lithium carbonate can degrade cell performance (see e.g., Cheng, et al., Phys. Chem. Chem. Phys., 2014, 16, 18294, the content of which is incorporated herein by reference in its entirety). While not wanting to be bound by theory, it is understood that in addition to physically etching the surface, laser treatment beneficially removes the lithium carbonate resistive layer.

The lithium ion inorganic conductive layer of the solid electrolyte according to an embodiment can be formed in a way that the grain boundary is formed to a minimum.

FIG. 1 is a schematic view illustrating a structure of an embodiment of a lithium battery including a solid electrolyte. The lithium battery may be a lithium metal battery using a lithium metal negative electrode.

Referring to FIG. 1, a solid electrolyte 12 is disposed on a positive electrode 11, and a lithium metal negative electrode 10 is disposed on the solid electrolyte 12. The solid electrolyte 12 includes a lithium ion inorganic conductive layer 12a and an amorphous film 12b that is disposed on a side of the lithium ion inorganic conductive layer 12a. The amorphous film 12b is disposed to be adjacent to the lithium metal negative electrode 10. The amorphous film comprises the amorphous phase. In FIG. 1, the amorphous film 12b is formed only on one side of the solid electrolyte, but in an embodiment the amorphous film 12b may be formed on both sides of the solid electrolyte 12.

Figure 2A:
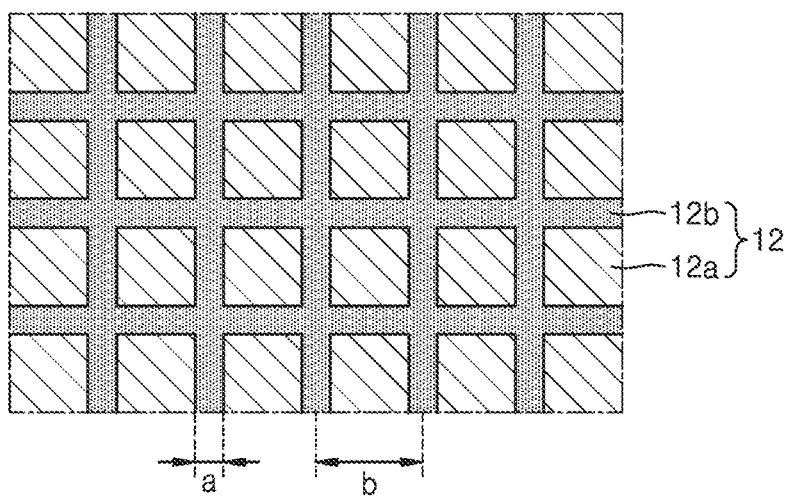
FIG. 2A is a schematic view illustrating a surface of an embodiment of the electrolyte for a lithium metal battery.
Figure 2B:
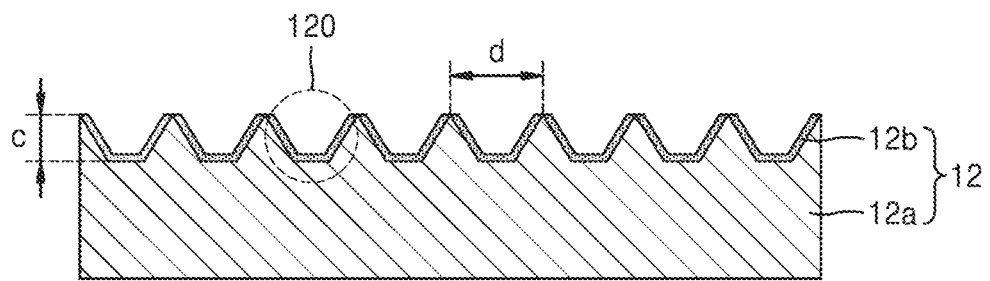
FIGS. 2B and 2C are each a schematic view illustrating a cross section of an embodiment of the electrolyte for a lithium metal battery.
Figure 2C:
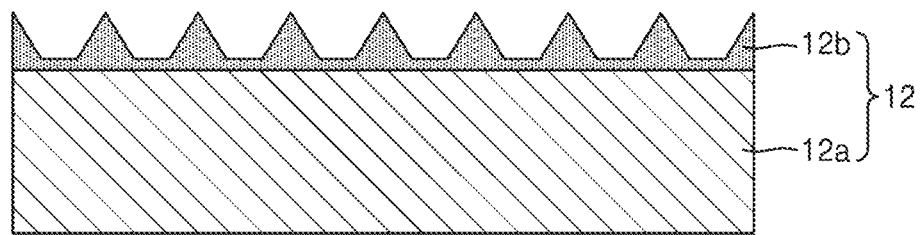

As shown in FIGS. 2A to 2C, the amorphous film 12b may be formed in the shape of a pattern on the lithium ion inorganic conductive layer 12a. A portion of or an entirely of the amorphous film 12b may be in the shape of a pattern. In FIG. 1, GB refers to grain boundary of the lithium ion inorganic conductive layer 12a.

The pattern is not particularly limited to any size and shape, and any suitable pattern may be used as long as a pattern may increase a surface area of the solid electrolyte and effectively suppress the volume expansion after operation of a lithium battery including the solid electrolyte. In this regard, a pattern may have a regular or irregular shape.

As non-limiting examples of the shape of the pattern according to an embodiment, the pattern may comprise at least one of a plurality of perpendicular lines and a plurality of parallel lines [e.g., grid]. For example, the plurality of perpendicular lines may be a line type, and the plurality of parallel lines may be a mesh type (shown in FIG. 2A).

The pattern has an area of from 1 to 900 cm$^2$. The perpendicular or parallel lines may have a line width of about 1 micrometer (μm) to about 1000 μm, about 5 μm to about 500 μm, or about 10 to about 30 μm.

Referring to FIG. 2A, a line width and a pattern width b indicate a pattern size and a pattern width. The line width varies depending on the size of laser beam. The pattern size may be, for example, in a range of about 10 μm to about 10,000 μm, and the pattern width b indicates a pattern cycle or a pattern interval, and for example, may be in a range of about 1 μm to about 150 μm, about 1 μm to about 50 μm, or about 10 μm to about 30 μm. When the line width a and the pattern width b are within the ranges above, a surface area of the solid electrolyte increases so that the interfacial resistance between the solid electrolyte and at least one of a positive electrode and a negative electrode may be effectively decreased and the propagation of lithium ions into the grain boundary of the solid electrolyte and the growth of the lithium ions therein may be suppressed, thereby effectively preventing growth of dendrites.

The size and width of the pattern are influenced by the size of laser beam or the like.

Referring to FIG. 2B, it is confirmed that the pattern may be formed over the entire amorphous film 12b present on the surface of the lithium ion inorganic conductive layer 12a. In an embodiment, referring to FIG. 2C, it is confirmed that the pattern may be formed locally only on the surface of the amorphous film 12b.

As shown in FIG. 2B, the pattern may be formed to comprise a plurality of linear grooves 120, wherein the grooves 120 may have different ranges and depths depending on laser processing conditions. In an embodiment, a depth c of a groove may be in a range from about 0.1 μm to about 20 μm, about 0.5 μm to about 15 μm, or about 1 μm to about 10 μm, and a width d of the grooves may be about 1 μm to about 200 μm, about 10 μm to about 150 μm, about 20 μm to about 100 μm.

The amorphous film may include a plurality of grooves and a protrusion between the plurality of grooves, wherein the plurality of grooves are spaced apart, on a portion of the lithium ion inorganic conductive layer. A bottom of the plurality of grooves may be a flat surface, or a curved surface having a radius of curvature.

The plurality of grooves may be periodically disposed.

In an embodiment, a surface area of the solid electrolyte in which a pattern is disposed on the surface of the amorphous film may be increased by about 200% to about 500%, for example, about 300% to about 450%, or about 350% to about 400%, as compared to a surface area of the solid electrolyte in which a pattern is not disposed on the surface of the amorphous film. In an embodiment, the surface area of the amorphous film may be about 35 $cm^2/cm^3$ to about $1\times10^6$ $cm^2/cm^3$, about 50 $cm^2/cm^3$ to about $1\times10^5$ $cm^2/cm^3$, or about 100 $cm^2/cm^3$ to about $1\times10^4$ $cm^2/cm^3$. When the solid electrolyte having such surface area characteristics is used, an activation area between the solid electrolyte and at least one of a positive electrode and a negative electrode also increases, and thus a lithium battery having improved rate performance may be manufactured. In the solid electrolyte according to an embodiment, at least one of a ceramic layer, a ceramic glass layer, or both may be formed on the unpatterned surface of the lithium ion inorganic conductive layer. The ceramic layer may be a crystalline film comprising a crystalline phase, and the ceramic glass layer may be a semi-crystalline film comprising a semi-crystalline phase.

The term "a semi-crystalline film" means a mixed phase including a crystalline phase and an amorphous phase, and t includes, for example, a glass-ceramic.

In the solid electrolyte according to an embodiment, the amorphous film may have a reduced number of grain boundaries.

In the solid electrolyte according to an embodiment, a semi-crystalline film can be further included between the lithium ion inorganic conductive layer and the amorphous film. The semi-crystalline film may be formed using a melt quenching method, and the semi-crystalline film may be formed to have a thickness which is less than that of the amorphous film.

A crystalline film can be further included between the semi-crystalline film and the amorphous film. The crystalline film between the semi-crystalline film and the amorphous film may be the same or different from a crystalline film of the lithium ion inorganic conductive layer. For example, the lithium ion inorganic conductive layer may be a first crystalline film, and the crystalline film between the semi-crystalline film and the amorphous film may be a second crystalline film.

Figure 2D:
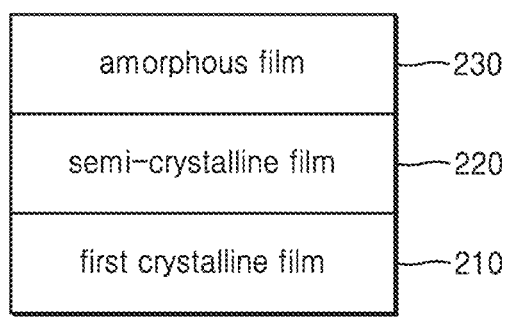
FIGS. 2D and 2E are each a schematic view illustrating a crystal state of an embodiment of the electrolyte for a lithium metal battery.
Figure 2E:
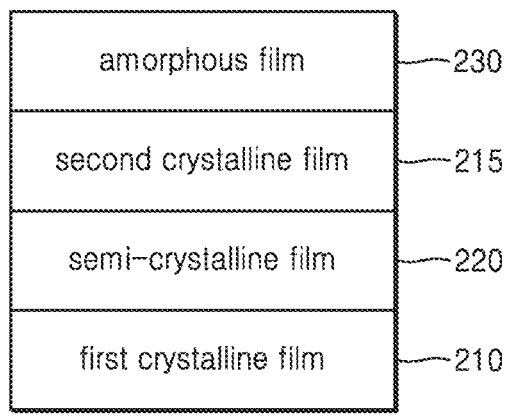

FIGS. 2D and 2E are each are a schematic view illustrating a crystal state of the solid electrolyte according to an embodiment. Referring to FIG. 2D, the solid electrolyte according to an embodiment may have a structure in which a first crystalline film 210, a semi-crystalline film 220, and an amorphous film 230 are sequentially disposed in this stated order. Referring to FIG. 2E, the solid electrolyte according to an embodiment may have a structure in which a first crystalline film 210, a semi-crystalline film 220, a second crystalline film 215, and an amorphous film 230 are sequentially disposed in this stated order.

In the solid electrolyte, the presence of the amorphous film, the semi-crystalline film, and the crystalline film may be identified by transmission electron microscopy/selected area electron diffraction ("TEM/SAED"). For example, through TEM/SAED analysis, when the lithium ion inorganic conductive layer of the solid electrolyte is a lithium-lanthanum-zirconium oxide ("LLZO")-based film, such as $Li_7La_3Zr_{1.7}W_{0.3}O_{12}$, the formation of the amorphous phase in the solid electrolyte may be identified. That is, the presence of the semi-crystalline film between the amorphous phase and the crystalline phase may be confirmed. In addition, a crystalline structure of the LLZO-based film, i.e., a garnet structure, may be identified. Using TEM/SAED analysis, a ratio of the crystalline film, the amorphous film, and the semi-crystalline film may be directly and/or indirectly identified.

A thickness of the amorphous film may be, for example, in a range of about 5 nm to about 5 μm, about 50 nm to about 5 μm, about 50 nm to about 300 nm, or about 5 nm to about 100 nm. A thickness of the semi-crystalline film may be less than that of the amorphous film, and for example, may be in a range of about 2 nm to about 3 μm, about 3 nm to about 2 μm, or about 3 nm to about 50 nm.

In an embodiment, a thickness ratio of the amorphous film to the semi-crystalline film may be in a range of about 1:0.2 to about 1:0.8.

In an embodiment, when a thickness of the amorphous film is about 200 nm, the semi-crystalline film may be configured to have a thickness in a range of, for example, about 100 nm to about 150 nm. In an embodiment, when a thickness of the amorphous film is about 2 μm, the semi-crystalline film may be configured to have a thickness of 1 μm or less.

In polymer electrolyte according to an embodiment, a crystallinity of the lithium ion inorganic conductive layer gradually increases in a direction away from the amorphous film. The thickness of the amorphous film is less than that of an additional amorphous film, and the thickness of the amorphous film may be, for example, about 5 nm to about 5 micrometers (μm), about 10 nm to about 1 μm, or about 20 nm to about 500 nm.

An ion conductivity at 60° C. of the solid electrolyte is in a range of about $5\times10^{-4}$ Siemens per centimeter ($Scm^{-1}$) or greater.

The lithium ion inorganic conductive layer may include at least one compound of a garnet compound, an argyrodite compound, a lithium super ionic conductor ("LISICON"), a sodium super ionic conductor ("NASICON"), lithium nitride, lithium hydride, perovskite, and lithium halide.

The lithium ion inorganic conductive layer may include, for example, at least one of a Li-garnet-based ceramic, such as $Li_{3+x}La_3M_2O_{12}$ wherein $0 \leq x \leq 5$ and M is tellurium (Te), niobium (Nb), or zirconium (Zr), a doped garnet-based ceramic, such as $Li_{3+x}La_3M_2O_{12}$ (wherein $0 \leq x \leq 5$ and M is Te, Nb, or Zr), $Li_{1+x+y}Al_xTi_{2-x}Si_yP_{3-y}O_{12}$ (wherein $0<x<2$ and $0 \leq y<3$), $BaTiO_3$, $Pb(Zr_xTi_{1-x})O_3$ wherein $0 \leq x \leq 1$ (PZT), $Pb_{1-x}La_xZr_{1-y}Ti_yO_3$ (PLZT) (wherein $0 \leq x<1$ and $0 \leq y<1$), $Pb(Mg_{1/3}Nb_{2/3})O_3$—$PbTiO_3$ (PMN-PT), lithium phosphate ($Li_3PO_4$), lithium titanium phosphate ($Li_xTi_y(PO_4)_3$) (wherein $0<x<2$ and $0<y<3$), lithium aluminum titanium phosphate ($Li_xAl_yTi_z(PO_4)_3$) (wherein $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (where $0 \leq x \leq 1$, $0 \leq y \leq 1$, $0 \leq a \leq 1$, $0 \leq b \leq 1$), lithium lanthanum titanate ($Li_xLa_yTiO_3$) (wherein $0<x<2$ and $0<y<3$), lithium germanium thiophosphate ($Li_xGe_yP_zS_w$) (wherein $0<x<4$, $0<y<1$, $0<z<1$, and $0<w<5$), lithium nitride ($Li_xN_y$) (wherein $0<x<4$ and $0<y<2$), a $SiS_2$ glass ($Li_xSi_yS_z$) (wherein $0 \leq x<3$, $0<y<2$, and $0<z<4$), a $P_2S_5$ glass ($Li_xP_yS_z$) (wherein $0 \leq x<3$, $0<y<3$, and $0<z<7$), $Li_{3x}La_{2/3-x}TiO_3$ (wherein $0 \leq x \leq \frac{1}{6}$), $Li_7La_3Zr_2O_{12}$, $Li_{1+y}Al_yTi_{2-y}(PO_4)_3$ (wherein $0 \leq y \leq 1$), $Li_{1+z}Al_zGe_{2-z}(PO_4)_3$ (wherein $0 \leq z \leq 1$), $Li_2O$, $LiF$, $LiOH$, $Li_2CO_3$, $LiAlO_2$, a $Li_2O$—$Al_2O_3$—$SiO_2$—$P_2O_5$—$TiO_2$—$GeO_2$ ceramic, $Li_{10}GeP_2S_{12}$, $Li_{3.25}Ge_{0.25}P_{0.75}S_4$, $Li_3PS_4$, $Li_6PS_5Br$, $Li_6PS_5Cl$, $Li_7PS_5$, $Li_6PS_5I$, $Li_{1.3}Al_{0.3}Ti_{1.7}(PO_4)_3$, $LiTi_2(PO_4)_3$, $LiGe_2(PO_4)_3$, $LiHf_2(PO_4)_3$, $LiZr_2(PO_4)_3$, $Li_2NH_2$, $Li_3(NH_2)_2I$, $LiBH_4$, $LiAlH_4$, $LiNH_2$, $Li_{0.34}La_{0.51}TiO_{2.94}$, $LiSr_2Ti_2NbO_9$, $Li_{0.06}La_{0.66}Ti_{0.93}Al_{0.03}O_3$, $Li_{0.34}Nd_{0.55}TiO_3$, $Li_2CdCl_4$, $Li_2MgCl_4$, $Li_2ZnI_4$, and $Li_2CdI_4$.

The lithium ion inorganic conductive layer can be, for example, a compound represented by the Formula 1 or 1a.

$$Li_{7-x}M^1_xLa_{3-a}M^2_aZr_{2-b}M^3_bO_{12} \quad \text{Formula 1}$$

$$Li_{7-x}La_{3-a}M^2_aZr_{2-b}M^3_bO_{12} \quad \text{Formula 1a}$$

wherein, in Formula 1, $M^1$ comprises at least one of gallium (Ga) and aluminum (Al), in Formulas 1 and 1a, $M^2$ comprises at least one of calcium (Ca), strontium (Sr), cesium (Cs), and barium (Ba), $M^3$ includes at least one of aluminum (Al), tungsten (W), niobium (Nb), and tantalum (Ta), and $0 \leq x<3$, $0 \leq a \leq 3$, and $0 \leq b<2$.

In Formula 1, x may be from 0.01 to 2.1, for example, 0.01 to 0.99, for example, from 0.1 to 0.9, and from 0.2 to 0.8. In Formula 1, a may be from 0.1 to 2.8, for example, 0.5 to 2.75, and b may be from 0.1 to 1, for example, 0.25 to 0.5.

The compound represented by Formula 1 may be, for example, at least one of $Li_7La_3Zr_{1.7}W_{0.3}O_{12}$, $Li_{4.9}La_{2.5}Ca_{0.5}Zr_{1.7}Nb_{0.3}O_{12}$, $Li_{4.9}Ga_{0.5+\delta}La_3Zr_{1.7}W_{0.3}O_{12}$ wherein $0 \leq \delta \leq 2.5$, $Li_{6.4}La_3Zr_{1.7}W_{0.3}O_{12}$, $Li_7La_3Zr_{1.5}W_{0.5}O_{12}$, $Li_7La_{2.75}Ca_{0.25}Zr_{1.75}Nb_{0.25}O_{12}$, $Li_7La_3Zr_{1.5}Nb_{0.5}O_{12}$, $Li_7La_3Zr_{1.5}Ta_{0.5}O_{12}$, $Li_{6.272}La_3Zr_{1.7}W_{0.3}O_{12}$, or $Li_{5.39}Ga_{0.5+\delta}La_3Zr_{1.7}W_{0.3}O_{12}$ ($0 \leq \delta \leq 1.11$).

In the compound represented by the Formula 1, a dopant may be at least one of $M^1$, $M^2$, and $M^3$. In the compound represented by the Formula 1a, a dopant may be at least one of $M^2$ and $M^3$.

An amount of the dopant in the amorphous film can be reduced to be equal or less than about 50%, for example, equal to or less than about 30% or equal to or less than about 10%, or about 0.1 to about 50%, or about 1 to about 40%, of an amount of a dopant in an amorphous film obtained by heat treatment only.

In an embodiment, a total amount of a dopant in the amorphous film can be less than a total amount of a dopant in the crystalline film. In an embodiment, a difference between a total amount of a dopant in the crystalline film and a total amount of a dopant in the amorphous film can be, for example, at least about 0.5 atom % or more, for example, about 1 atom % or more, or at least about 2 atom % to about 3 atom %, or about 0.5 atom % to about 3 atom %.

In an embodiment, an amount of a dopant in the amorphous film can be about 30 mole percent (mol %) or less, for example, about 5 mol % or less, about 0.1 mol % or less, about 0.05 mol % or less, or about 0.01 mol % to about 30 mol %, or about 0.1 mol % to about 10 mol %, based on a total content of the amorphous film.

In an embodiment, the surface chemistry can be intentionally modified by addition of a chemical component to enhance the formation of the amorphous surface layer during laser treatment. The addition of, for example, boron oxide to the surface, can promote formation of an amorphous layer on the LLZO surface.

In the solid electrolyte, a semi-crystalline film is further included between the crystalline film and the amorphous film. In the compound represented by the Formulas 1 and 1a, a dopant may be at least one of $M^1$, $M^2$, and $M^3$. In the compound represented by the Formula 1a, a dopant may be at least one of $M^2$ and $M^3$.

An amount of the dopant in the amorphous film can be reduced compared with an amount of a dopant in the crystalline film. A lithium ion inorganic conductor of the lithium ion inorganic conductive layer includes a mixture of a first phase compound, which is a major component satisfying the stoichiometric composition, and a second phase compound, which is a minor component. The amount of the dopant may be equal to or less than about 1 mol %, based on 100 mol % of the amorphous film.

In an embodiment in which the lithium ion inorganic conductor includes the compound represented by Formula 1 as the first phase compound, and the compound represented by Formula 1a as the second phase compound, the amount of the second phase compound may be about 0.1 to about 10 parts by weight, for example, about 0.5 to about 5 parts by weight, based on 100 parts by weight of the first phase compound and the second phase compound.

The amorphous film is a product obtained by irradiating laser beam onto the lithium ion inorganic conductive layer in a patterning process. In addition, a thickness of the amorphous film may be in a range of about 50 nm to about 5 μm, for example, about 10 nm to about 500 nm. In addition, the lithium ion inorganic conductive layer may be a crystalline film including a crystal grain boundary, and a thickness ratio of the lithium ion inorganic conductive layer to the amorphous film may be in a range of about 1:0.001 to about 1:0.2, for example, about 1:0.002 to about 1:0.1, and for example, may be 1:0.004.

The lithium ion inorganic conductive layer according to an embodiment may include doped LLZO. In the lithium ion inorganic conductive layer, LLZO grains may serve as a crystalline film and an amount of a dopant of the doped LLZO is relatively high at the crystal grain boundary.

The solid electrolyte may have an ion conductivity of about $1 \times 10^{-7}$ Scm$^{-1}$ to about $5 \times 10^{-3}$ Scm$^{-1}$, for example, about $1 \times 10^{-4}$ Scm$^{-1}$ to about $1 \times 10^{-3}$ Scm$^{-1}$. In addition, the solid electrolyte may be a liquid-impermeable dense layer having a porosity of about 30% or less. The porosity of the solid electrolyte may be, for example, about 25% or less, about 22% or less, about 10% or less, about 5% or less, or about 1% or less, or a porosity of about 0.1% to about 25%, or about 0.1% to about 0.5%.

The term "porosity" is the ratio of the area occupied by the pores to the total area. The porosity can be obtained by observing the cross section through scanning electron microscope (SEM) analysis or BET method. Porosity can be evaluated, for example, by using an image of a scanning electron microscope in which a solid electrolyte cross section is photographed.

A thickness of the solid electrolyte may be in a range of about 1 μm to about 300 μm, for example, about 2 μm to about 100 μm or about 30 μm to about 60 μm.

Hereinafter, a method of preparing the solid electrolyte for the lithium battery will be described in detail.

The solid electrolyte may be prepared by a method including: performing a step of forming a lithium ion inorganic conductive layer; and performing a step of disposing an amorphous film on at least one side of the lithium ion inorganic conductive layer by irradiating a laser beam onto the lithium ion inorganic conductive layer.

In an embodiment, the laser beam may be irradiated such that a surface area of the lithium ion inorganic conductive layer after performing the irradiation of the laser beam in the second step is increased by about 10% to about 1,000%, for example, about 10% to about 500% as compared to a surface area of the lithium ion inorganic conductive layer before performing the irradiation of the laser beam in the second step, thereby forming a pattern on the lithium ion inorganic conductive layer.

The forming of the lithium ion inorganic conductive layer may further include: pressing inorganic lithium ion conductor powder to produce a film-type product; and performing heat treatment on the film-type product. The heat treatment may be performed at a temperature in a range of about 700° C. to about 1,500° C.

According to the conditions described above, the lithium ion inorganic conductive layer with a decreased or minimized grain boundary may be prepared.

After inorganic lithium ion conductor powder is used to provide the film-type product, heat treatment may be performed thereon. As such, when the inorganic lithium ion conductor powder is heat treated, changes in a composition of a lithium ion conductor that constitutes a film may be suppressed during the film manufacturing process.

In an embodiment, the step of forming a lithium ion inorganic conductive layer may be performed by subjecting the inorganic lithium ion conductor powder to a hot press process at a temperature of about 700° C. to about 1,500° C.

In an embodiment, the step of forming a lithium ion inorganic conductive layer may be performed by casting a composition including the inorganic lithium ion conductor powder, a solvent, a plasticizer, a binder, and a dispersing agent and then heating the resulting product at a temperature of about 25° C. to about 1,200° C. For example, the solvent may be at least one of any suitable alcohol or glycol, such as ethanol, butanol, and propylene glycol. The plasticizer may be for example dibutyl phthalate, and the binder may for example polyvinyl butyral. Also, as the dispersing agent, an alkylammonium salt solution of polycarboxylic acid may be used, which is available under the trade name Anti-terra 202 (Palmer Holland).

During the irradiation of the laser beam, the laser beam used herein may be, for example, an ultraviolet ("UV")-laser. A soft etching process is performed with a laser beam having a power in a range of about 0.5 watts (W) to about 15 W, for example, about 0.7 W to about 1 W, a wavelength in a range of about 300 nm to about 3,000 nm, and a frequency in a range of about 100 kilohertz (kHz) to about 1,000 kHz, for example, 57 Hz. In addition, the laser beam used herein may have a size in a range of about 10 μm to about 10,000 μm, for example, about 20 μm to about 50 μm or about 30 μm. Here, the term "a size of the laser beam" denotes a diameter of the laser beam. In addition, the laser beam used herein may have a laser pulse repetition rate in a range of about 1 kHz to about 100 kHz, or a laser pulse repetition rate of about 70 kHz.

During the irradiation of the laser beam, a gas medium or a solid-state medium may be used. For use as a gas medium, a helium-neon (He—Ne) laser, a carbon dioxide ($CO_2$) laser, an argon (Ar) laser, or an excimer laser may be selected. For use as a solid-state medium, neodymium-doped yttrium aluminum garnet ("Nd:YAG"), Neodymium-doped yttrium orthovanadate ("Nd:YVO$_4$"), or ytterbium fiber may be selected.

When a laser beam is used, line widths of the laser beam may be formed in various sizes depending on the wavelength of the laser beam. For example, a line width of a pattern may reach a minimum line level that may be directly patterned by a laser beam. In addition, depending on a laser device, the minimum line width may be sub-micrometers and the maximum line width may be in a range of several hundred micrometers. In addition, when output energy of the laser beam is controlled, the shape of the pattern may be controlled without limitation. When the laser beam is used, a pattern may be formed by partially using a diffractive optical element or a mask to control the shape of the beam in favor of the pattern.

After a pattern is formed on the surface of the amorphous film by the irradiation with the laser described above, a separate washing and air-blowing process may be additionally performed thereon.

When the solid electrolyte is $Li_{6.4}La_3Zr_{1.7}W_{0.3}O_{12}$ ("LLZO"), as described above, a temperature at the surface of the solid electrolyte is instantaneously raised upon application of the laser thereto and then maintained at 25° C. According to such surface quenching effects, the LLZO on the surface of the amorphous film may undergo structural changes from a cubic crystal structure to an amorphous crystal structure. When a pattern space has a same size as or is smaller than a laser spot size, the entire surface of the solid electrolyte may be treated with the laser beam. According to the actual TEM image of the cross section of the laser-treated LLZO, it is confirmed that the amorphous film is formed on the surface of the LLZO. Such an amorphous film formed on the surface does not have any grain boundary, which is highly reactive with lithium metal, so that the propagation and growth of lithium ions in the solid electrolyte may be suppressed. In addition, using EDX analysis on the solid electrolyte, it is confirmed that a dopant mainly present on grain boundary of the inorganic solid electrolyte is observed in a relatively small amount at a laser-treated part. Thus, when the LLZO film of which a surface is treated with laser is applied as a solid electrolyte for a lithium metal battery, a lithium metal battery may be operated for a long period of time without a short circuit.

According to an aspect, a lithium battery includes: a negative electrode; a positive electrode, and the solid electrolyte.

The negative electrode may be for example lithium metal negative electrode including lithium metal or an alloy of lithium metal. The lithium battery using the lithium metal negative electrode may be a lithium metal battery. The negative electrode may contain a negative electrode active material suitable for use in a lithium battery.

The lithium battery may be an all solid battery.

Hereinafter, a lithium metal battery using a lithium metal negative electrode as the negative electrode will be described.

The amorphous film of the solid electrolyte may be disposed to be adjacent to the lithium metal negative electrode or the positive electrode. In an embodiment, the amorphous film of the solid electrolyte may be, for example, disposed to be adjacent to the lithium metal negative electrode.

The lithium battery may further include an interlayer between the lithium metal negative electrode and the solid electrolyte. The interlayer may serve to increase adhesion between the lithium metal negative electrode and the solid electrolyte, or may serve to protect the lithium metal negative electrode. A thickness of the interlayer may be in a range of about 1 μm to about 10 μm, for example, about 1 μm to about 2 μm.

The interlayer may include at least one of polyethylene oxide, gold (Au), aluminum oxide ($Al_2O_3$), lithium aluminate ($LiAlO_2$), zinc (Zn), silicon (Si), and lithium phosphate.

The lithium metal battery according to an embodiment may further include a protective layer of the lithium metal negative electrode. Any suitable material may be used as the lithium protective layer of the lithium metal negative electrode, and an example thereof includes a poly(oxyethylene methacrylate) ("POEM") film.

When the lithium metal negative electrode protective film is a POEM film, a combination use with a poly(ethylene oxide) ("PEO") film as an interlayer may be advantageous in reducing the interfacial resistance between the solid electrolyte and the lithium metal negative electrode.

The interfacial resistance between the lithium metal negative electrode and the solid electrolyte may be in a range of about 10 ohm-square centimeters ($\Omega cm^2$) to about 500 $\Omega cm^2$, for example, about 50 $\Omega cm^2$ to about 100 $\Omega cm^2$.

The solid electrolyte according to an embodiment may be utilized as an anolyte of a hybrid electrolyte. The hybrid electrolyte refers to a dual-structured electrolyte in which a liquid (or gel) electrolyte is used for a positive electrode electrolyte and a solid electrolyte is used for a negative electrode electrolyte.

Figure 8:
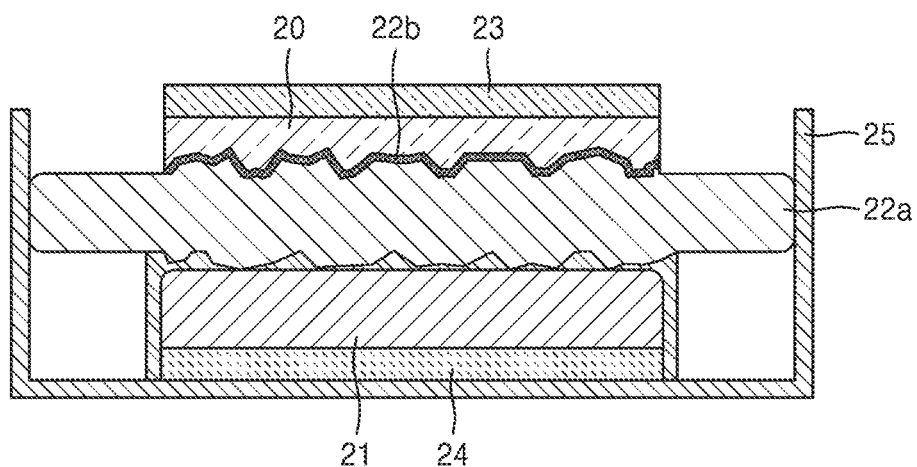
FIG. 8 is a schematic view illustrating a structure of an embodiment of a lithium metal battery.

FIG. 8 is a schematic view illustrating a structure of a lithium metal battery according to an embodiment.

Referring to FIG. 8, a positive active material layer 21 is stacked on a positive current collector 24 to form a positive electrode, and a solid electrolyte 22a having a structure in which a pattern is formed on each of the both sides thereof is stacked on the positive electrode. In addition, a lithium metal negative electrode 20 and a copper current collector 23 are stacked on the solid electrolyte 22a.

In addition, an interlayer 22b is disposed between the solid electrolyte 22a and the lithium metal negative electrode 20, thereby allowing satisfactory adhesion between the solid electrolyte 22a and the lithium metal negative electrode 20. In addition, as shown in FIG. 8, a space between the positive electrode and the solid electrolyte 22a may be filled with an ionic liquid catholyte ("IL catholyte"). Reference number 25 refers to a battery case.

The interlayer 22b can be, for example, a PEO film or an Au film.

The IL catholyte can include, for example, at least one of an ionic liquid, a polymer-ionic liquid, a lithium salt, and an organic solvent.

The ionic liquid can be any suitable ionic liquid.

The ionic liquid which can be added to the IL catholyte refers to a salt in a liquid state at 25° C. or a fused salt at 25° C. that consists of only ions having a melting point equal to or below 25° C. The ionic liquid may be at least one of compounds each including i) a cation of at least one of ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, and mixtures thereof, and ii) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^{2-}$, $CF_3SO_3^-$, $(FSO_2)_2N^-$, $(C_2F_6SO_2)_2N^-$, $(C_2F_5SO_2)(CF_3SO_2)N^-$, and $(CF_3SO_2)_2N^-$.

In an embodiment, the ionic liquid may be at least one of N-methyl-N-propylpyrrolidinium bis(trifluoromethylsulfonyl)imide, N-butyl-N-methyl-pyrrolidinium bis(trifluoromethylsulfonyl)imide, 1-butyl-3-methyl-imidazolium bis(trifluoromethylsulfonyl)imide, and 1-ethyl-3-methyl-imidazolium bis(trifluoromethylsulfonyl)imide.

The polymeric ionic liquid which may be added to the IL catholyte may be, for example, a polymerization product of ionic liquid monomers, or a polymeric compound. The polymer ionic liquid is highly dissoluble in an organic solvent, and thus may further improve the ion conductivity of polymer layer when further added to the protective layer-forming composition.

When the polymeric ionic liquid is prepared by polymerization of ionic liquid monomers as described above, a resulting product from the polymerization reaction may be washed and dried, followed by anionic substitution reaction to have appropriate anions that may improve solubility in an organic solvent.

In an embodiment, the polymer ionic liquid may include a repeating unit that includes i) a cation of at least one of an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, and mixtures thereof, and ii) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^{2-}$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

In an embodiment, the polymeric ionic liquid may be prepared by polymerization of ionic liquid monomers. For example, the ionic liquid monomers may have a polymerizable functional group such as a vinyl group, an allyl group, an acrylate group, or a methacrylate group, and may include a cation of at least one of an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, and mixtures thereof, and at least one of the above-listed anions.

Non-limiting examples of the ionic liquid monomers are 1-vinyl-3-ethylimidazolium bromide, a compound of Formula 2, or a compound of Formula 3:

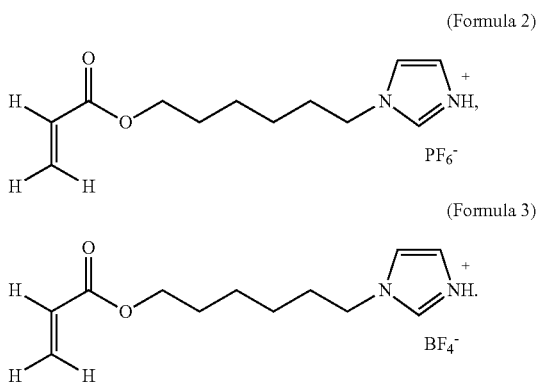

(Formula 2)

(Formula 3)

For example, the polymer ionic liquid can be a compound represented by Formula 4 or a compound represented by Formula 5:

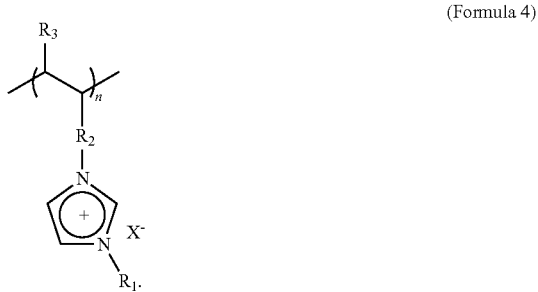

(Formula 4)

In Formula 4, $R_1$ and $R_3$ may be each independently a hydrogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_2$-$C_{30}$ heteroaryl group, or a substituted or unsubstituted $C_4$-$C_{30}$ carbocyclic group;

$R_2$ may be a chemical bond, a $C_1$-$C_{30}$ alkylene group, a $C_6$-$C_{30}$ arylene group, a $C_2$-$C_{30}$ heteroarylene group, or a $C_4$-$C_{30}$ divalent carbocyclic group;

$X^-$ indicates an anion of the ionic liquid; and n may be from about 500 to 2800.

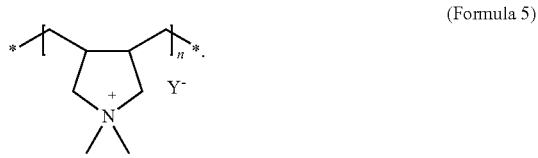

(Formula 5)

In Formula 5, $Y^-$ is an anion, such as $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^{2-}$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, or $(O(CF_3)_2C_2(CF_3)_2O)_2PO^-$; and n can be from 500 to 2800.

For example, in Formula 5, $Y^-$ may be bis(trifluoromethylsulfonyl)imide (TFSI), bis(fluorosulfonyl)imide, $BF_4^-$, or $CF_3SO_3^-$.

The polymeric ionic liquid may include, for example a cation of poly(1-vinyl-3-alkylimidazolium), poly(1-allyl-3-alkylimidazolium), poly(1-methacryloyloxy-3-alkylimidazolium), and an anion of $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, and $(CF_3SO_2)(CF_3CO)N^-$.

For example, the compound of Formula 5 may be polydiallydimethyl ammonium bis(trifluoromethylsulfonyl)imide.

In an embodiment, the polymer ionic liquid may include a low-molecular weight polymer, a thermally stable ionic liquid, and a lithium salt. The low-molecular weight polymer may have an ethylene oxide chain. The low-molecular weight polymer may be a glyme. Non-limiting examples of the glyme are polyethyleneglycol dimethylether (polyglyme), tetraethyleneglycol dimethyl ether (tetraglyme), and triethyleneglycol dimethylether (triglyme). According to an aspect, a solid electrolyte includes a garnet layer that conducts lithium ions; and an amorphous a lithium-lanthanum-zirconium oxide ("LLZO") surface of the garnet layer. The amorphous LLZO surface has less than 10% of its total area directly covered by lithium carbonate, and the garnet layer comprises a crystalline garnet, i.e., the crystalline phase having a garnet-type structure.

The solid electrolyte may be a sheet type, and the amorphous LLZO surface may cover about 90% or more of the major surface area of the sheet. The interface between the garnet layer and the amorphous LLZO may be arranged such that the crystallinity of the interface increases as the distance from the amorphous LLZO surface increases. The depth of the amorphous surface adjacent to the crystalline interface may be, for example, about 50 nm or more.

Each element of a lithium metal battery including a solid electrolyte according to an embodiment, and a method of manufacturing the lithium metal battery now will be described in further detail.

A positive active material for the positive electrode may include at least one of lithium cobalt oxide, lithium nickel cobalt manganese oxide, lithium nickel cobalt aluminum oxide, lithium iron phosphate, and lithium manganese oxide, but is not limited thereto. Any suitable positive active material may be used.

For example, the positive active material may be a compound represented by one of the following formulae: $Li_aA_{1-b}B'_bD_2$ (wherein $0.90 \leq a \leq 1.8$, and $0 \leq b \leq 0.5$), $Li_aE_{1-b}B'_bO_{2-c}D_c$ (wherein $0.90 \leq a \leq 1.8$, $0 \leq b \leq 0.5$, and $0 \leq c \leq 0.05$), $LiE_{2-b}B'_bO_{4-c}D_c$ (wherein $0 \leq b \leq 0.5$, and $0 \leq c \leq 0.05$), $Li_aNi_{1-b-c}Co_bB'_cD_\alpha$ (wherein $0.90 \leq a \leq 1.8$, $0 \leq b \leq 0.5$, $0 \leq c \leq 0.05$, and $0 < \alpha \leq 2$), $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulae above, A is at least one of nickel (Ni), cobalt (Co), and manganese (Mn); B' is at least one of aluminum (Al), nickel (Ni), cobalt (Co), manganese (Mn), chromium (Cr), iron (Fe), magnesium (Mg), strontium (Sr), vanadium (V), and a rare earth element; D is at least one of oxygen (O), fluorine (F), sulfur (S), and phosphorus (P); E is at least one of cobalt (Co), and manganese (Mn), F' is at least one of fluorine (F), sulfur (S), and phosphorus (P); G is at least one of aluminum (Al), chromium (Cr), manganese (Mn), iron (Fe), magnesium (Mg), lanthanum (La), cerium (Ce), strontium (Sr), and vanadium (V); Q is at least one of titanium (Ti), molybdenum (Mo), and manganese (Mn), I' is at least one of chromium (Cr), vanadium (V), iron (Fe), scandium (Sc), and yttrium (Y); and J is at least one of vanadium (V), chromium (Cr), manganese (Mn), cobalt (Co), nickel (Ni), and copper (Cu).

For example, the positive active material may be a compound represented by Formula 6, a compound represented by Formula 7, a compound represented by Formula 8, or a compound represented by Formula 9

$$Li_a Ni_b Co_c Mn_d O \qquad \text{(Formula 6)},$$

wherein, in Formula 6, $0.90 \le a \le 1.8$, $0 \le b \le 0.9$, $0 \le c \le 0.5$, and $0 \le d \le 0.5$;

$$Li_2 MnO_3 \qquad \text{(Formula 7)};$$

$$LiMO_2 \qquad \text{(Formula 8)};$$

wherein, in Formula 8, M can be Mn, Fe, Co, or Ni; and $$Li_a Ni_b Co_c Al_d O_2 \qquad \text{(Formula 9)},$$

wherein, in Formula 9, $0.90 \le a \le 1.8$, $0 \le b \le 0.9$, $0 \le c \le 0.5$, and $0 \le d \le 0.5$.

The positive electrode of the lithium metal battery may be manufactured as follows.

A positive active material, a binder, and a solvent are mixed to prepare a positive active material composition. A conducting agent may be further added into the positive active material composition. The positive active material composition is directly coated on a metallic current collector and dried to prepare a positive electrode plate. In an embodiment, the positive active material composition may be cast on a separate support to form a positive active material film, which may then be separated from the support and then laminated on a metallic current collector to prepare a positive electrode plate.

The binder is a composition that contributes to binding of an active material and a conductive material with a current collector, and thus an amount of the binder added may be from about 1 part by weight to about 50 parts by weight, based on 100 parts by weight of the total weight of the positive active material. Non-limiting examples of the binder include polyvinylidene fluoride ("PVDF"), polyvinyl alcohol, carboxymethylcellulose ("CMC"), starch, hydroxypropylcellulose, reproduced cellulose, polyvinylpyrrolidone, polytetrafluoroethylene, polyethylene, polypropylene, ethylene-propylene-diene terpolymer ("EPDM"), sulfonated EPDM, styrene butadiene rubber, fluorine rubber, and various copolymers. The amount of the binder may be from about 2 parts by weight to about 5 parts by weight, based on 100 parts by weight of the total weight of the positive active material. When the content of the binder is within this range, a binding force of the positive active material layer to the current collector may be satisfactory.

The conducting agent may be any suitable material that does not cause chemical change in the lithium metal battery and has conductivity. Non-limiting examples of the conducting agent include graphite such as natural graphite or artificial graphite; carbonaceous materials, such as carbon black, acetylene black, Ketjen black, channel black, furnace black, lamp black, or summer black; conductive fibers, such as carbon fibers or metal fibers; carbon fluoride; metal powder, such as aluminum or nickel powder; conductive whiskers, such as zinc oxide or potassium titanate; a conductive metal oxide, such as a titanium oxide; and a conductive material, such as a polyphenylene derivative.

The amount of the conducting agent may be from about 1 part by weight to about 10 parts by weight, for example, from about 2 parts by weight to about 5 parts by weight, based on 100 parts by weight of the total weight of the positive active material. When the amount of the conducting agent is within any of these ranges, the final positive electrode may have good conductivity characteristics.

A non-limiting example of the solvent is N-methylpyrrolidone.

The amount of the solvent may be from about 100 parts by weight to about 2,000 parts by weight, based on 100 parts by weight of the positive active material. When the amount of the solvent is within this range, a process for forming the positive active material layer may be easily carried out.

The amounts of the positive active material, the conducting agent, the binder, and the solvent may be any suitable levels for the manufacture of lithium metal batteries. At least one of the conducting agent, the binder, and the solvent may be omitted depending on the use and structure of a lithium metal battery.

The negative electrode may be, for example, a lithium metal thin film or a lithium metal alloy thin film, as described above.

A lithium metal alloy for the negative electrode may include lithium, and a metal/metalloid alloyable with lithium. Examples of the metal/metalloid alloyable with lithium are Si, Sn, Al, Ge, Pb, Bi, Sb, a Si—Y' alloy (wherein Y' is at least one of an alkaline metal, an alkaline earth metal, a Group 13 to Group 16 element, a transition metal, and a rare earth element, except for Si), a Sn—Y' alloy (wherein Y' is at least one of an alkaline metal, an alkaline earth metal, a Group 13 to Group 16 element, a transition metal, and a rare earth element, except for Sn). Y may be at least one of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, and Po.

The solid electrolyte according to an embodiment of the present disclosure is used as the electrolyte. The amorphous film of the solid electrolyte is disposed to be adjacent to the lithium metal negative electrode or positive electrode. For example, the amorphous film of the solid electrolyte is disposed to be adjacent to the lithium metal negative electrode. The lithium metal battery comprises an interlayer between the lithium metal negative electrode and the solid electrolyte. The interlayer. The interlayer acts to increase the adhesion between the negative electrode and the solid electrolyte.

The lithium metal battery further comprises a protective layer on the lithium metal negative electrode in addition to the interlayer. The lithium metal battery according to an embodiment of the present disclosure includes a separator and/or a lithium salt-containing non-aqueous electrolyte suitable for use in lithium metal batteries.

The separator may be an insulating thin film having high ion permeability and high mechanical strength. The separator may have a pore diameter of about 0.01 μm to about 10 μm, and a thickness of about 5 μm to about 20 μm. Non-limiting examples of the separator are olefin-based polymers, such as polypropylene, and sheets or non-woven fabric made of glass fiber or polyethylene. When a lithium metal battery uses a solid polymer electrolyte, the solid polymer electrolyte may also serve as the separator.

For example, the separator may be a monolayer or a multilayer including at least two layers of polyethylene, polypropylene, polyvinylidene fluoride, or a combination thereof. For example, the separator may be a mixed multilayer, such as a two-layer separator of polyethylene/polypropylene, a three-layer separator of polyethylene/polypropylene/polyethylene, or a three-layer separator of polypropylene/polyethylene/polypropylene. The separator may include an electrolyte including a lithium salt and an organic solvent.

The lithium salt-containing nonaqueous electrolyte may include a nonaqueous electrolyte and a lithium salt. The nonaqueous electrolyte may be a nonaqueous liquid electrolyte, an organic solid electrolyte, or an inorganic solid electrolyte.

The nonaqueous liquid electrolyte may include an organic solvent. The organic solvent may be any suitable organic solvent. For example, the organic solvent may be at least one propylene carbonate, ethylene carbonate, fluoroethylene carbonate, butylene carbonate, dimethyl carbonate, diethyl carbonate, methyl ethyl carbonate, methylpropyl carbonate, ethylpropyl carbonate, methylisopropyl carbonate, dipropyl carbonate, dibutyl carbonate, chloroethylene carbonate, benzonitrile, acetonitrile, tetrahydrofuran, 2-methyltetrahydrofuran, γ-butyrolactone, 1,3-dioxolane, 4-methyldioxolane, N,N-dimethyl formamide, N,N-dimethyl acetamide, dimethylsulfoxide, dioxane, 1,2-dimethoxyethane, sulfolane, dichloroethane, chlorobenzene, nitrobenzene, diethylene glycol, and dimethyl ether.

For example, the lithium salt may be at least one of $LiPF_6$, $LiBF_4$, $LiSbF_6$, $LiAsF_5$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, and LiI. For example, to improve charge-discharge characteristics and resistance to flame in a lithium metal battery, pyridine, triethylphosphate, triethanolamine, cyclic ether, ethylene diamine, n-glyme, hexamethyl phosphoramide, nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, or aluminum trichloride may be added to the nonaqueous electrolyte. In an embodiment, to provide nonflammable characteristics, a halogen-containing solvent such as carbon tetrachloride, ethylene trifluoride, or the like may be further added to the nonaqueous electrolyte, if desired.

For example, the lithium metal battery according to an embodiment may have improved capacity and improved lifetime characteristics, and thus may be used in a battery cell for use as a power source of a small device, and may also be used as a unit battery of a medium-large size battery pack or battery module that include a plurality of battery cells for use as a power source of a medium-large size device.

Examples of the medium-large size device are electric vehicles ("EVs"), including hybrid electric vehicles ("HEVs") and plug-in hybrid electric vehicles ("PHEVs"), electric two-wheeled vehicles, including E-bikes and E-scooters; power tools; power storage devices; and the like, but are not limited thereto.

Hereinafter, the present disclosure will now be described in detail with reference to the following examples. However, these examples are not intended to limit the scope of the one or more embodiments of the present disclosure.

EXAMPLES

Example 1

Preparation of Lithium-Lanthanum-Zirconium Oxide ("LLZO") Film $Li_{6.4}La_3Zr_{1.7}W_{0.3}O_{12}$ (W-doped LLZO) powder was uniaxially-pressed with a pressure of about 200 megapascals (MPa) into a pellet form. Subsequently, the pellet was covered with mother powder (i.e., $Li_{6.4}La_3Zr_{1.7}W_{0.3}O_{12}$), and then, heat treatment was performed thereon at a temperature of 1,200° C. for 4 hours. A surface of the pellet obtained therefrom was polished to form a lithium-lanthanum-zirconium oxide ("LLZO") film having a thickness of about 500 micrometers.

Example 2

Preparation of Lithium-Lanthanum-Zirconium Oxide ("LLZO") Film $Li_{6.4}La_3Zr_{1.7}W_{0.3}O_{12}$ (W-doped LLZO) powder was hot pressed into a thick pellet with a pressure of 20 MPa and temperature of 1,150° C. for 2 hours (hrs). Subsequently, the pellet was wire-saw-sliced into about 350 micrometer thick discs. Some of the discs were polished to 250 micrometer or 150 micrometer thinner discs. The pellets were ultrasound cleaned in hexane to remove cutting and polishing fluids and dust. Finally, the pellets were laser cut to needed size and shape to form the LLZO film having a thickness of about 60 micrometers (μm).

Figure 16:
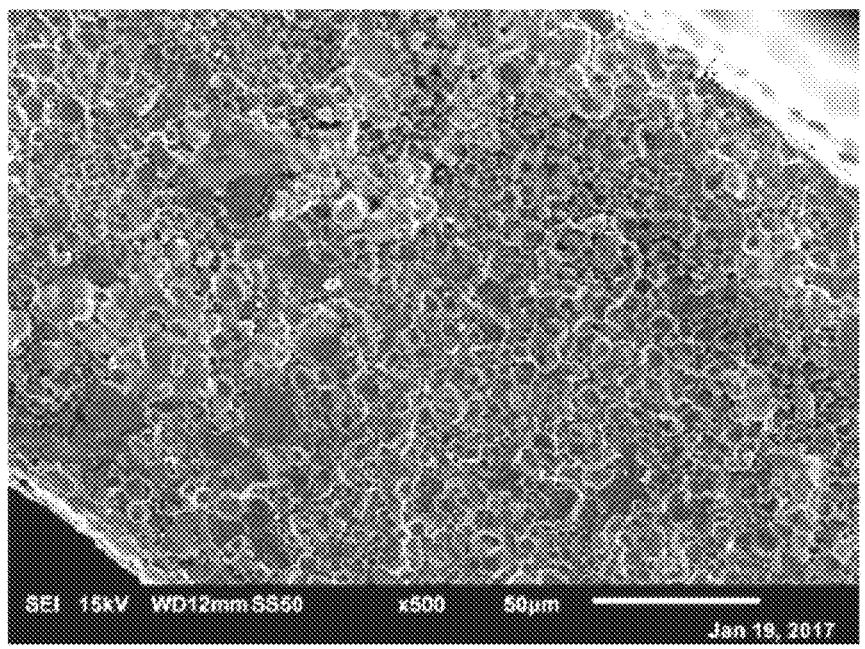
FIG. 16 shows the fractured cross-sectional SEM image of a fractured pellets.

FIG. 16 shows the fractured cross-sectional SEM image of the pellets.

Example 3

Preparation of LLZO Film

A $Li_{4.9}Ga_{0.5+\delta}La_3Zr_{1.7}W_{0.3}O_{12}$ (0≤δ≤1.6) film was prepared by a tape casting method. The $Li_{4.9}Ga_{0.5+\delta}La_3Zr_{1.7}W_{0.3}O_{12}$ (0≤δ≤1.6) powder was mixed in the tape casting slurry listed in Table 1. The slip was then casted into a thin film. After drying, the film was placed in a Pt box lined with $Li_{4.9}Ga_{0.5+\delta}La_3Zr_{1.7}W_{0.3}O_{12}$ (0≤δ≤1.6) powder but containing 30% excess Li to LLZO tape. After placed on the LLZO tape on the flat powder bed, more of the $Li_{4.9}Ga_{0.5+\delta}La_3Zr_{1.7}W_{0.3}O_{12}$ (0≤δ≤1.6) powder was used covered on the tape. The box with the tape was subjected to heat treatment with the following schedule:

Heating from about 25° C. to 1050° C., heating rate of 300° C./hour (hr);

Hold at about 1050° C. for 2 hrs; and cooling from about 1050° C. to 25° C., cooling rate of 200° C./hr.

Figure 17:
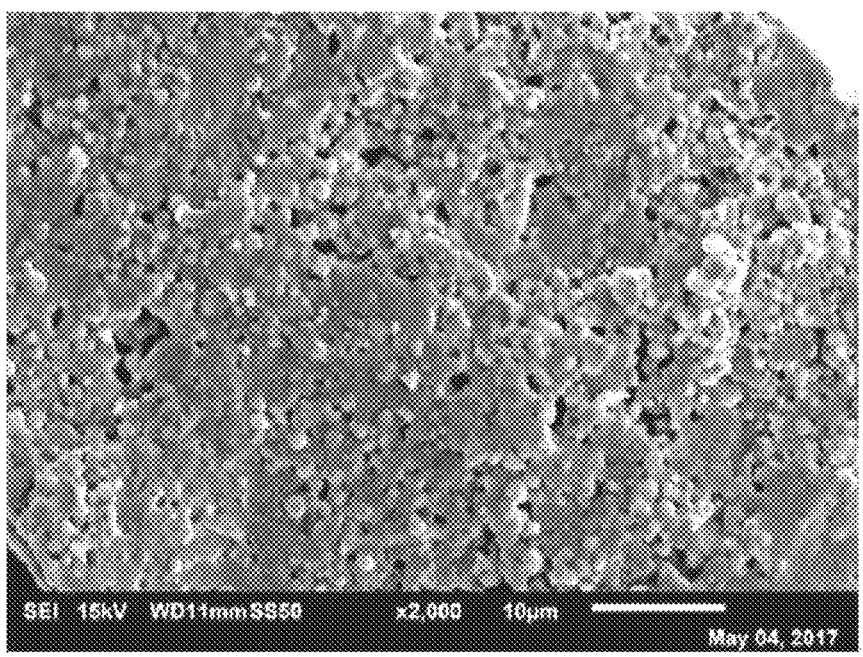
FIG. 17 shows a cross sectional SEM image of a fired lithium-lanthanum-zirconium oxide (LLZO) tape having a thickness of about 60 micrometers.

FIG. 17 shows a cross sectional SEM image of the fired LLZO tape, i.e., a fractured LLZO membrane made by tape casting having a thickness of about 60 micrometers.

TABLE 1

| Ingredient | Weight (grams) |
| --- | --- |
| LLZO garnet powder (0.6 micrometers) | 17 |
| solvent: a mixture of ethanol (77 volume percent (vol %)), butanol (19 vol %), and propylene glycol (4 vol %) | 33 |
| Dibutyl phthalate | 1.88 |
| PVB-B79 | 2.0 |
| Anti-terra 202 (dispersant) | 0.34 |

Example 3a

Preparation of LLZO Film

LLZO film was prepared as in Example 1, except that $Li_{4.9}La_{2.5}Ca_{0.5}Zr_{1.7}Nb_{0.3}O_{12}$ (Ca, Nb-doped LLZO) powder was used instead of $Li_{6.4}La_3Zr_{1.7}W_{0.3}O_{12}$ (W-doped LLZO) powder.

Example 3b

Preparation of LLZO Film

LLZO film was prepared as in Example 1, except that $Li_{4.9}Ga_{0.5+\delta}La_{2.5}Zr_{1.7}Nb_{0.3}O_{12}$ (0≤δ≤1.6) (Ga, Nb-doped LLZO) powder was used instead of $Li_{6.4}La_3Zr_{1.7}W_{0.3}O_{12}$ (W-doped LLZO) powder.

Example 3c

Preparation of LLZO Film

LLZO film was prepared as in Example 1, except that $Li_{6.272}La_3Zr_{1.7}W_{0.3}O_{12}$ (W-doped LLZO) powder was used instead of $Li_{6.4}La_3Zr_{1.7}W_{0.3}O_{12}$ (W-doped LLZO) powder.

Example 3d

Preparation of LLZO Film

LLZO film was prepared as in Example 1, except that $Li_{5.39}Ga_{0.5+\delta}La_3Zr_{1.7}W_{0.3}O_{12}$ (00δ≤03+pt (Ga,W-doped LLZO) powder was used instead of $Li_{6.4}La_3Zr_{1.7}W_{0.3}O_{12}$ (W-doped LLZO) powder.

Example 3e

Preparation of LLZO Film

LLZO film was prepared as in Example 1, except that the heat treatment was performed at a temperature of 1,140° C. for 2 hours.

Example 4

Preparation of Solid Electrolyte

The LLZO film having a thickness: about 350 μm was obtained in the same manner as in Example 1, except that the thickness of the LLZO film was adjusted to be about 350 μm. The LLZO film (having a thickness of about 350 μm) of Example 1 was irradiated with an ultraviolet ("UV")-laser (neodymium-doped yttrium aluminum garnet ("Nd:YAG") laser) so that upper and lower portions of the LLZO film were surface-treated. Accordingly, a solid electrolyte having a mesh or grid type pattern (and an area of 1 centimeter (cm)×1 cm) on the upper and lower portions was formed. The mesh or grid type pattern had a spacing interval between laser lines (center-on-center) of about 50 micrometers, between laser lines (edge-to-edge) of about 20 micrometers, and a laser size or line thickness of about 30 micrometers. To minimize surface reactions between the solid electrolyte and moisture in the air, the surface treatment associated with the laser irradiation was performed in a dry-air atmosphere to prepare a solid electrolyte.

Conditions for the UV laser irradiation are listed in Table 2.

TABLE 2

| Process variable | Condition |
| --- | --- |
| Wavelength | 355 nanometers (nm) |
| Laser beam spot size | 30 μm |
| Laser power | About 1 watt (W) |
| Frequency | 57 hertz (Hz) |
| Scanning speed | 2,000 millimeters per second (mm/s) |
| Laser pulse repetition rate | 70 kilohertz (kHz) |

Example 4a

Preparation of Solid Electrolyte

Example 4 was repeated except that the LLZO film of Example 3a was used instead of the LLZO film of Example 1.

Example 4b

Preparation of Solid Electrolyte

Example 4 was repeated except that the LLZO film of Example 3b was used instead of the LLZO film of Example 1.

Examples 5

Preparation of Solid Electrolytes

Solid electrolytes was prepared as in Example 4, except that the conditions for the UV laser irradiation were changed such that solid electrolyte having a mesh type pattern having an interval of about 150 μm was prepared. The mesh type pattern was formed on both upper and lower portions of the corresponding solid electrolyte.

Example 6

Preparation of Solid Electrolyte

Solid electrolyte was prepared as in Example 4, except that the conditions for the UV laser irradiation were changed such that solid electrolyte having a mesh type pattern having an interval of about 30 μm was prepared.

Example 7

Preparation of Solid Electrolyte

Solid electrolytes were prepared as in Example 4, except that the condition for the UV laser irradiation were changed such that only one surface of the LLZO film was surface-treated to form solid electrolyte having a mesh type pattern having an interval of about 30 μm.

Example 8

Preparation of Solid Electrolyte

Example 5 was repeated except that the LLZO film having a thickness of 60 μm of Example 2 was used instead of the LLZO film having a thickness of about 350 μm of Example 1. A solid electrolyte having a mesh type pattern having an interval of about 50 μm and an area of 1 cm×1 cm was formed on both the upper and lower surfaces of the solid electrolyte.

Example 9

Preparation of Lithium Metal Battery

First, a positive electrode was prepared as follows.

$LiCoO_2$ ("LCO"), a conducting agent (CA) (Super-P; Timcal Ltd.), polyvinylidene fluoride ("PVDF"), and N-methylpyrrolidone solvent were mixed to obtain a composition for forming a positive active material layer. A mixing weight ratio of the LCO to the conducting agent ("CA") to the PVDF in the composition was, for example, LCO:CA:PVDF=97:1.5:1.5. The amount of the N-methylpyrrolidone solvent was about 137 g when an amount of the LCO was 97 g.

An upper portion of an aluminum foil (having a thickness of about 15 μm) was coated with the composition for forming a positive active material layer, dried at a temperature of 25° C., and then, vacuum-dried at a temperature of 110° C., to produce a positive electrode.

The resulting positive electrode was immersed in an ionic liquid, e.g., N-methyl-N-propyl pyrrolidinium bis(fluorosulfonyl) imide ("$PYR_{13}FSI$") (the structure of the $PYR_{13}^+$ cation has the accompanying formula), and a gold (Au) layer was stacked thereon to a thickness of about 1.5 μm. Then, the solid electrolyte of Example 4, a lithium metal negative electrode (having a thickness of about 20 μm), and a current collector (copper foil) were stacked on an upper portion of the positive electrode including the gold (Au) layer stacked thereon, to produce a lithium metal battery (i.e., a hybrid electrolyte cell) having a stacked structure of FIG. 8.

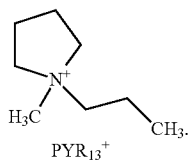

$PYR_{13}^+$

A liquid electrolyte was added to a space between the positive electrode and the lithium metal negative electrode, thereby preparing a lithium metal battery. The liquid electrolyte was an electrolyte having 1.0 M $LiN(SO_2F)_2$ (hereinafter, referred to as LiFSI) dissolved in a mixed solvent containing 1.2-dimethoxyethane ("DME") and 1,1,2,2-tetrafluoroethyl 2,2,3,3-tetrafluoropropyl ether ("TTE") at a volume ratio of 2:8.

Examples 10 to 13

Preparation of Lithium Metal Batteries

Lithium metal batteries were prepared as in Example 9, except that solid electrolytes of Examples 5 to 8 were used instead of the solid electrolyte of Example 4, respectively.

Example 14

Preparation of Lithium Symmetric Cell

Both sides of the solid electrolyte of Example 5 were each sputtered with Au to form a Au film. Subsequently, a lithium metal negative electrode was stacked on an upper portion of the Au film, and a heat treatment was performed thereon at a temperature of about 200° C. Then, a resting time was maintained at the same temperature for 20 minutes to allow adhesion of molten Li to the LLZO solid electrolyte, thereby preparing a lithium symmetric cell. To minimize the formation of contaminants on the surface of the molten Li, the preparation of the lithium symmetric cell was performed in a glove box in an argon gas atmosphere.

Example 15

Preparation of Lithium Metal Battery

A lithium metal battery was prepared as in Example 9, except that a polyethylene film was stacked instead of the gold (Au) layer.

Comparative Example 1

Preparation of Solid Electrolyte $Li_{6.4}La_3Zr_{1.7}W_{0.3}O_{12}$ prepared by Example 1 was wire-saw-sliced into 500 μm discs. Then, a $Li_7La_3Zr_2O_{12}$ amorphous oxide film having an average thickness of 0.5 μm was deposited on both surfaces of the disc by sputtering to obtain a solid electrolyte structure.

The solid electrolyte structure was placed between two stainless steel plates, and an impedance analyzer was connected to measure alternating current impedance. The measured lithium ion conductivity of the solid electrolyte was $1\times10^{-6}$ siemens per centimeter (S/cm).

According to Comparative Example 1, the amorphous phase was present inside the solid electrolyte so that the conduction of lithium-disrupted. Thus, it was confirmed that the solid electrolytes of Comparative Example 1 showed low ion conductivity as compared to the solid electrolyte of Example 1.

Comparative Example 2

Preparation of Solid Electrolyte

Precursors, such as $LiOH \cdot H_2O$, $Al_2O_3$, $GeO_2$, and $NH_4H_2PO_4$, were weighed and mixed under stoichiometric conditions to produce 3 g of a ceramic material. Then, the mixture was added to a platinum crucible, and was heat-treated at a temperature of about 500° C. for 2 hours. Next, the resulting powder was dry-milled in a ball mill with gate balls for 1 hour. Then, the resulting powder was heat-treated in a platinum crucible at a temperature of about 900° C. for 2 hours, followed by being crushed again under the same conditions as before to prepare a lithium aluminum germanium phosphate ("LAGP") powder. 1 g of the lithium aluminum germanium phosphate ("LAGP") powder was inserted into the mold and subjected to uniaxial pressing under a pressure of 4 tons to obtain pellets. The pellets were heat-treated at 950° C. for 2 hours to obtain a LAGP layer having a thickness of 700 μm and a density of 85%.

The above procedure was repeated to obtain three LAGP layers, and the three LAGP layers were thus formed to measure the ion conductivity, under three conditions i) before laser beam irradiation, ii) after laser beam irradiation, or iii) after heat treatment for recrystallization, respectively.

Figure 12:
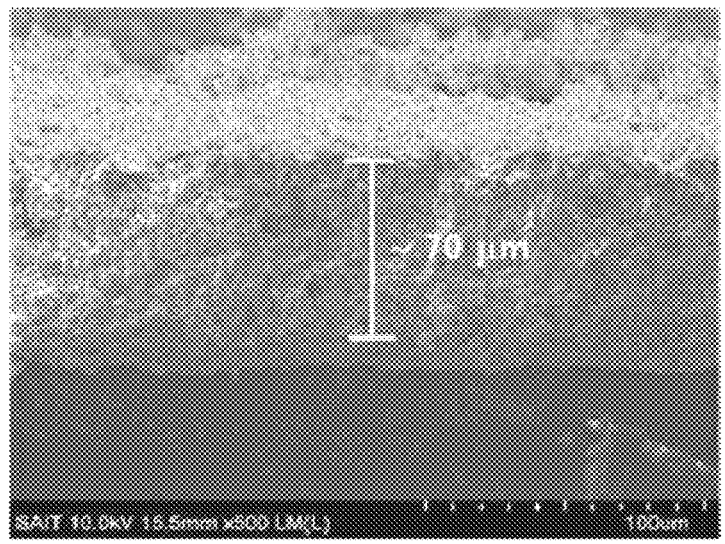
FIG. 12 is a TEM image of a solid electrolyte prepared according to Comparative Example 2.
Figure 13:
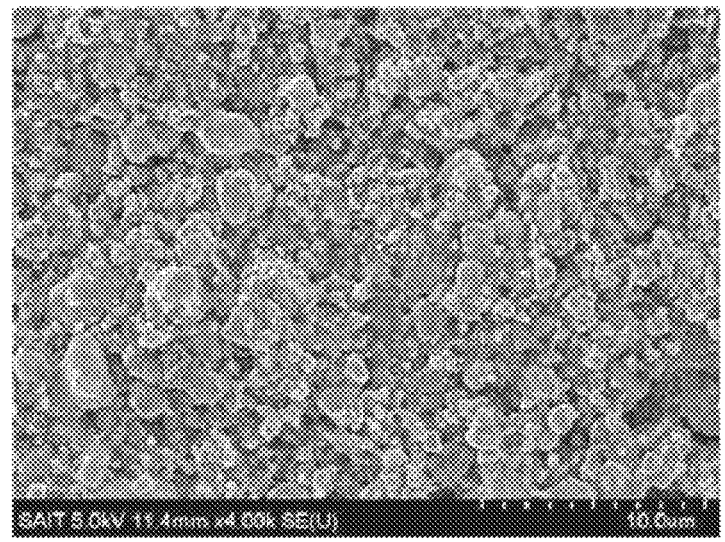
FIG. 13 is a SEM image of a solid electrolyte prepared according to Comparative Example 2.

The transmission electron microscopy/energy dispersive X-ray (TEM/EDX) analysis was performed on the layers prepared according to Comparative Example 2, and the results are shown in FIGS. 12 and 13.

Referring to the analysis results, it was confirmed that, when a film was prepared using crystalline LLZO particles or precursors and a solid electrolyte film was finally prepared using laser only without performing high-temperature heat treatment (1,000° C. or higher) as shown in Comparative Example 2, the resulting amorphous film did not have high density. When crystalline LLZO particles were used in a slurry form (using toluene/ethanol solvent) and a tape casting process and laser treatment was performed over the entire particles in the slurry form, the resulting film did not have high density, and had a porosity of 22% or less. In addition, due to weak adhesion between the particles, when a laser beam was applied, the cohesion between the particles was disrupted before melting. Thus, a liquid-impermeable non-crystalline LLZO film was not formed, and accordingly, was not use in a hybrid-structured electrolyte cell. In addition, as shown in Evaluation Example 8, the solid electrolyte that was prepared showed very low ion conductivity of less than $10^{-6}$ S/cm.

Comparative Example 3

Preparation of Lithium Metal Battery

A lithium metal battery was prepared as in Example 9, except that the solid electrolyte of Comparative Example 1 was used instead of the solid electrolyte of Example 4.

Comparative Example 4

Preparation of Lithium Symmetric Cell

Lithium symmetric cell was prepared as in Example 14, except that the solid electrolytes of Comparative Example 1 was used instead of the solid electrolyte of Example 5.

Comparative Example 5

Preparation of Lithium Symmetric Cell

Lithium symmetric cell was prepared in the same manner as in Example 14, except that the solid electrolytes of Comparative Example 2 were used instead of the solid electrolyte of Example 5.

Evaluation Example 1

Scanning Electron Microscopic ("SEM") Analysis

1) Solid Electrolytes of Examples 4 and 5

The SEM analysis was performed on the solid electrolytes of Examples 4 and 5.

Figure 3A:
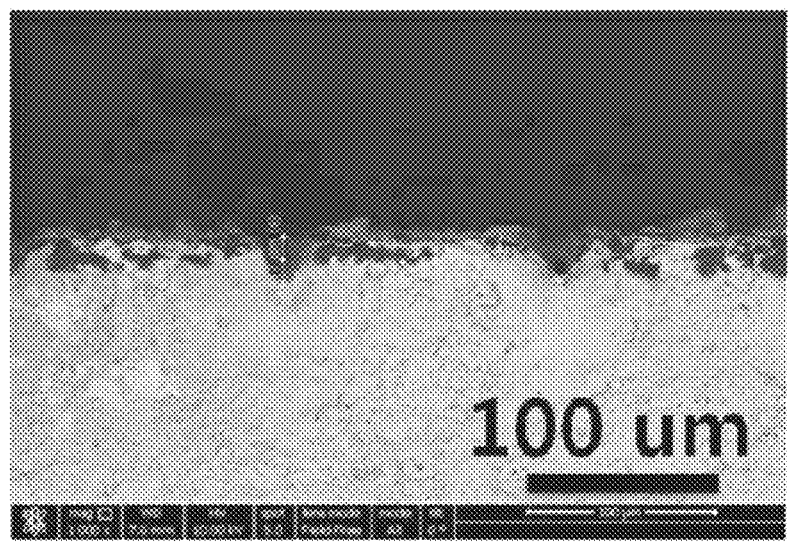
FIGS. 3A to 3C are scanning electron microscope (SEM) images showing the results of SEM analysis of a solid electrolyte prepared according to Example 4.
Figure 3B:
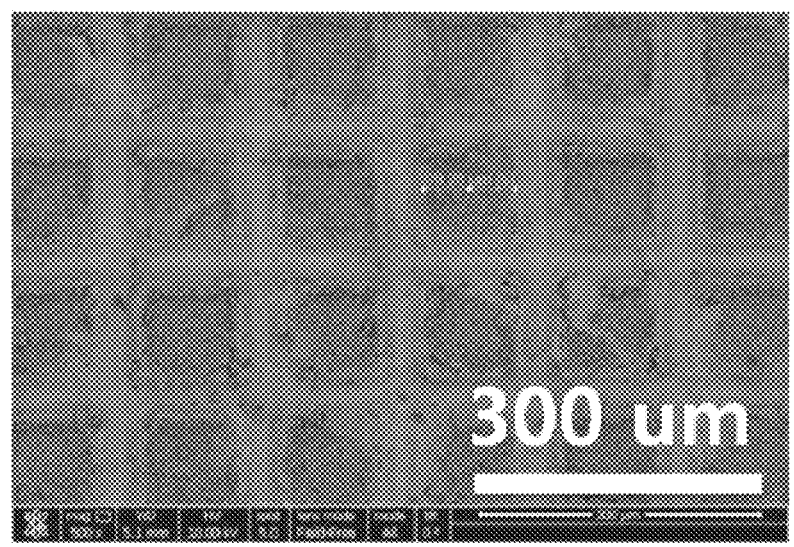
Figure 3C:
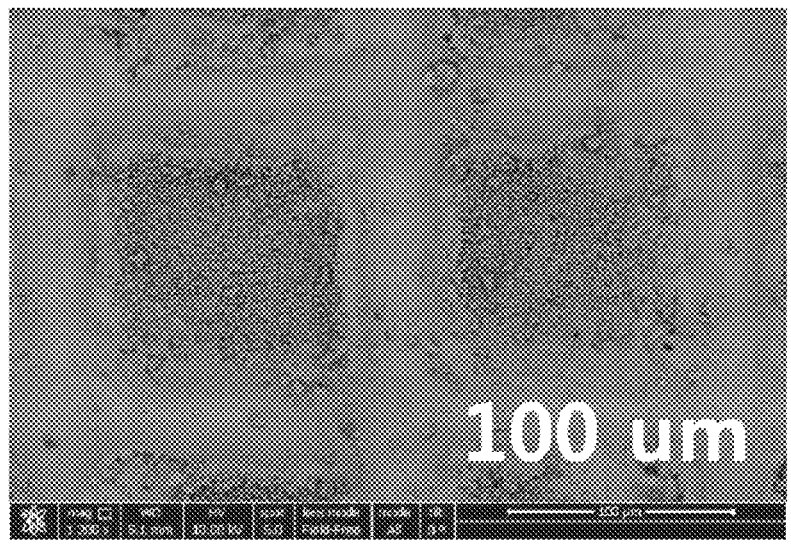
Figure 4A:
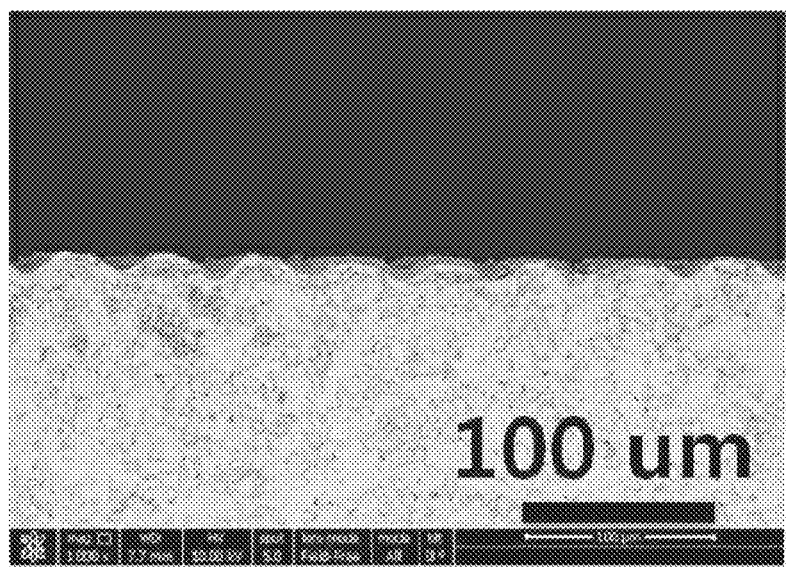
FIGS. 4A to 4C are SEM images of a solid electrolyte prepared according to Example 5.
Figure 4B:
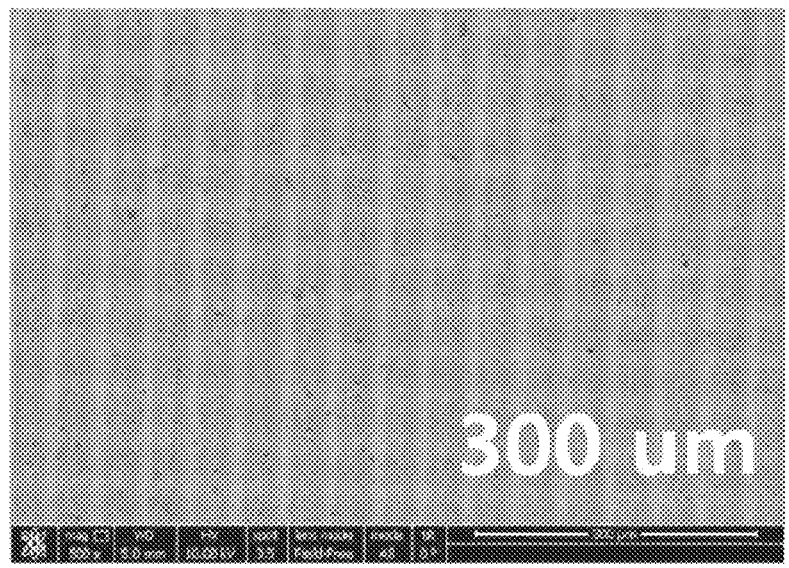
Figure 4C:
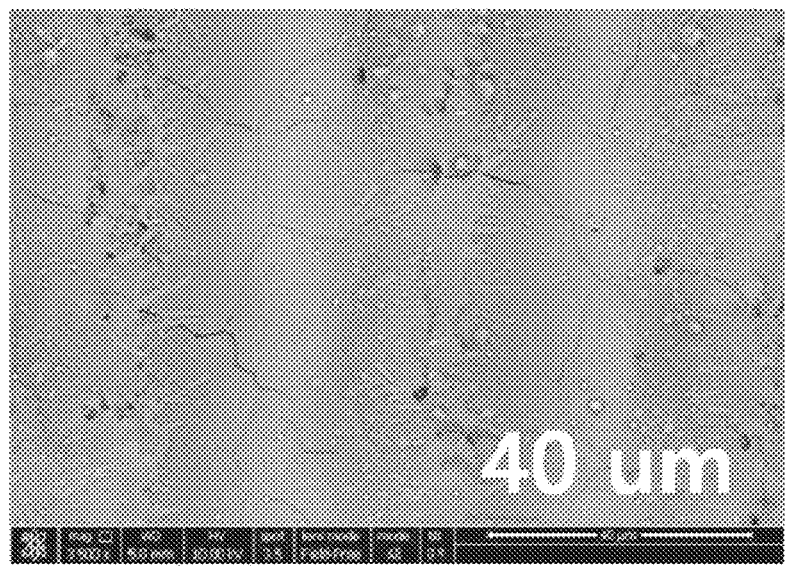

An SEM used herein was SU-8030 manufactured by Hitachi Company. SEM images of the solid electrolyte of Example 4 were shown in FIGS. 3A to 3C, and SEM images of the solid electrolyte of Example 5 were shown in FIGS. 4A to 4C.

Referring to the figures, it was confirmed that, due to the surface treatment performed on the LLZO solid electrolyte using the laser irradiation, the surface area of the LLZO solid electrolyte increased. Accordingly, it was also confirmed that, when the LLZO solid electrolyte was in contact with a lithium metal negative electrode, the activation area of the LLZO solid electrolyte also increased.

2) Solid Electrolyte of Example 7

The SEM analysis was performed on the solid electrolyte of Example 7 under the same conditions as the SEM analysis performed on the solid electrolytes of Examples 4 and 5. The analysis result of the solid electrolyte prepared according to Example 4 is shown in FIG. 4D.

Figure 4D:
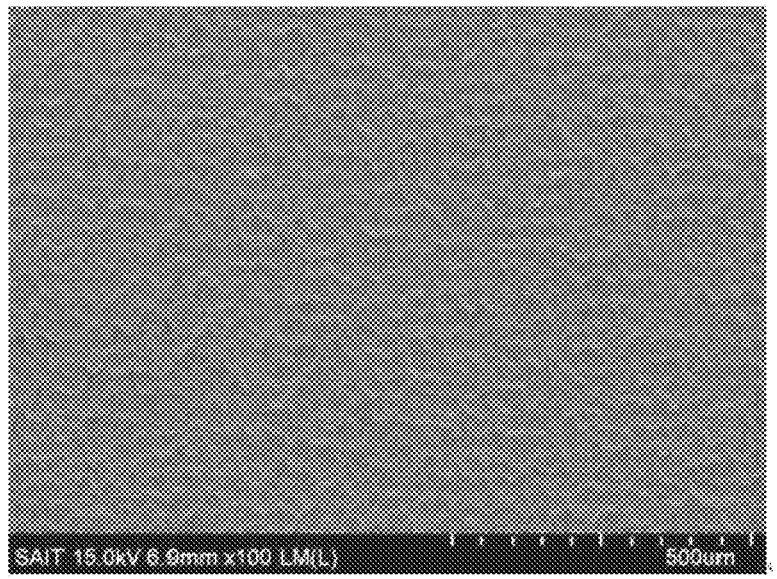
FIG. 4D is an SEM image showing analysis result of a solid electrolyte prepared according to Example 4.

Referring to FIG. 4D, it was confirmed that the surface of the solid electrolyte of Example 4 had an irregular shape. The solid electrolyte of Example 5 exhibited almost the same analytical results as the solid electrolyte of Example 4.

Evaluation Example 2

Transmission Electron Microscopy/Energy Dispersive X-Ray ("TEM/EDX") Analysis

Figure 5A:
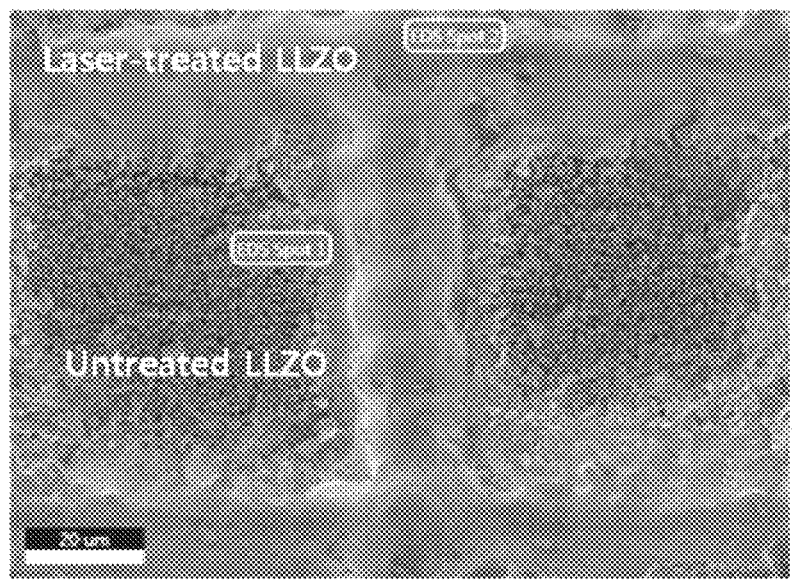
FIGS. 5A to 5C show the results of transmission electron microscopy and energy dispersive X-ray (TEM/EDX) analysis of a solid electrolyte prepared according to Example 4, in which FIGS. 5B and 5C each include a graph of intensity (arbitrary units, a.u.) versus energy (electron volts, eV) and a table providing the results of elemental analysis by energy dispersive spectroscopy (EDS)
Figure 5B:
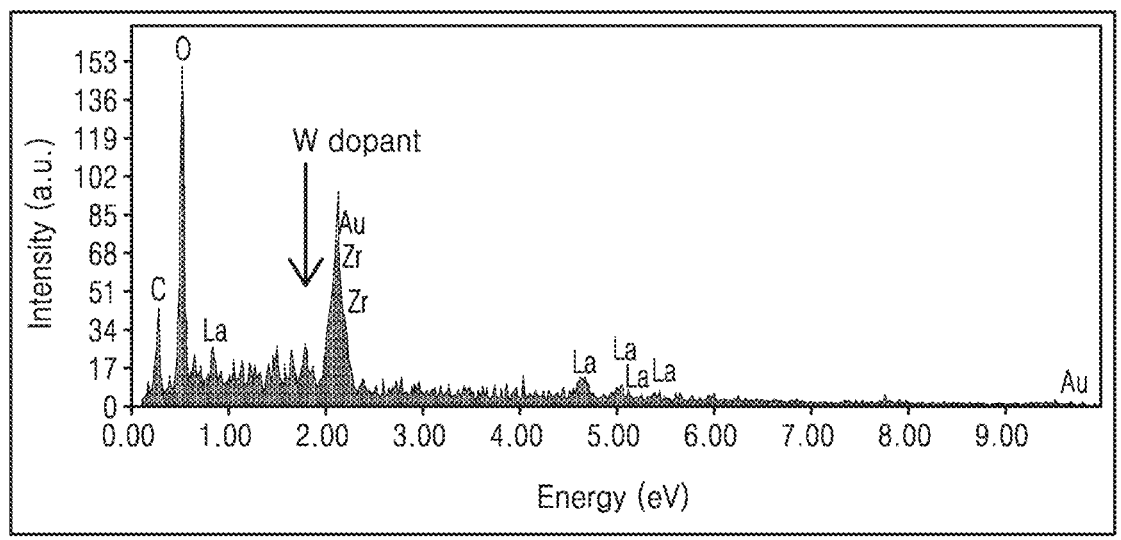
Figure 5C:
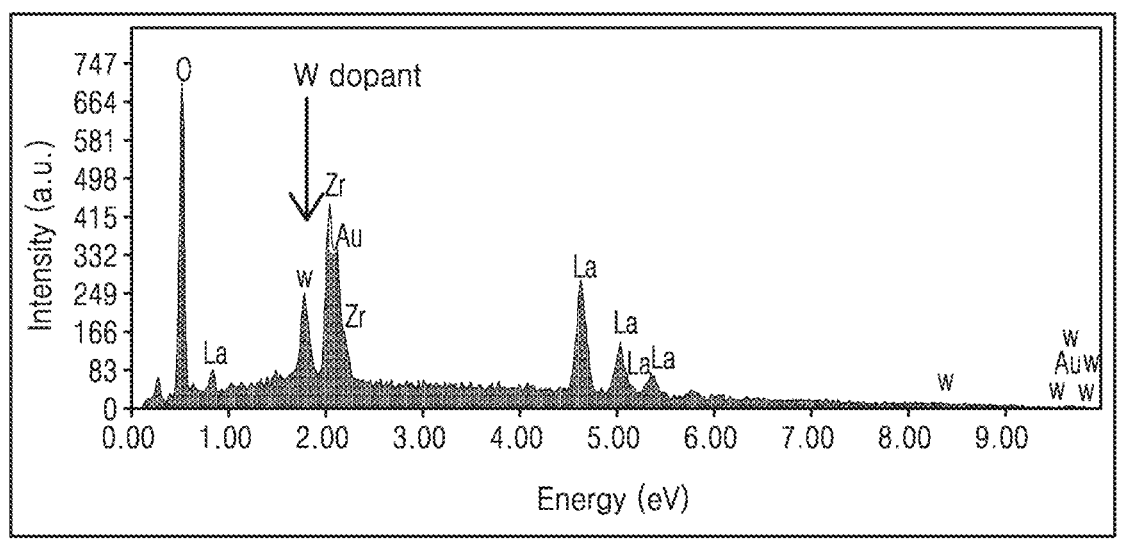

The TEM/EDX analysis was performed on the solid electrolyte of Example 4. The amorphous film of the solid electrolyte of Example 4 at EDS Spot 1 and EDS Spot 2 (see FIG. 5A) was subjected to the TEM/EDX analysis. The EDS results for Spot 1 are provided in FIG. 5B, and the EDS results for Spot 2 are provided in FIG. 5C.

Referring to the analysis, it was confirmed that an amount of tungsten, which serves as a dopant in the non-crystalline phase, was reduced to 1 atomic % or less in the solid electrolyte of Example 4. Thus, when the solid electrolyte of Example 4 or the like was used, a lithium metal battery including the solid electrolyte may have improved durability.

Evaluation Example 3

TEM Analysis

1) Solid Electrolyte of Example 4

The state of the solid electrolyte of Example 4 was observed using a TEM for analysis. An analyzing device used herein was Titan cubed 60-300 manufactured by FEI, and the analysis results are shown in FIGS. 6A to 6D.

Figure 6A:
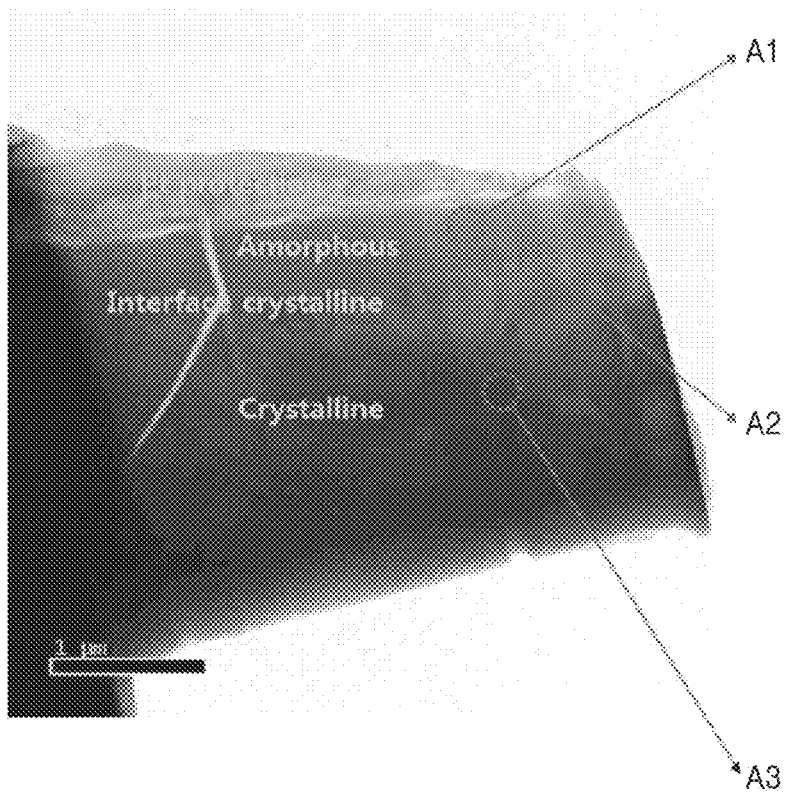
FIGS. 6A to 6D are transmission electron microscope (TEM) images showing the results of TEM analysis of a solid electrolyte prepared according to Example 4.
Figure 6B:
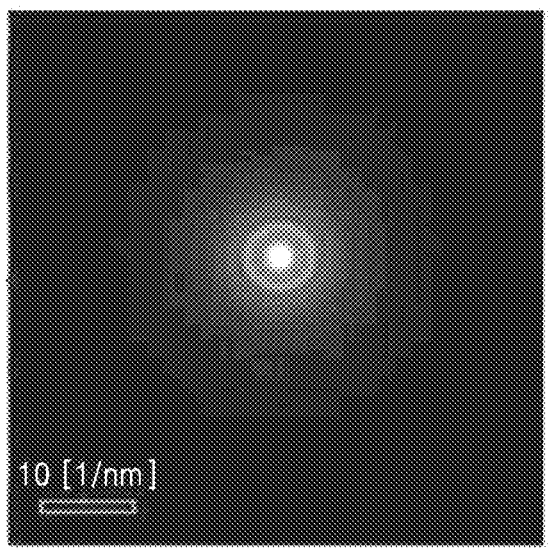
Figure 6C:
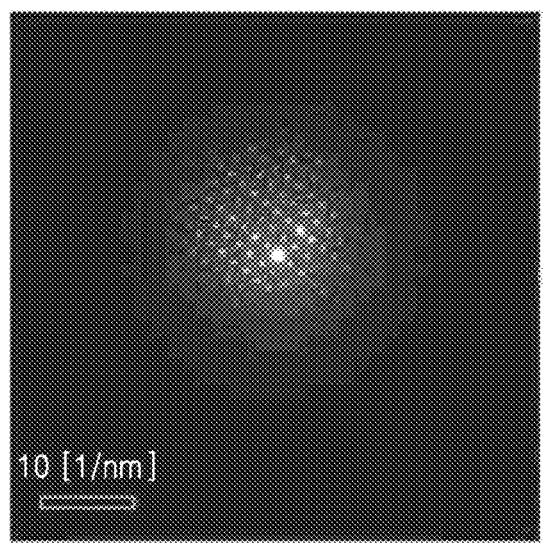
Figure 6D:
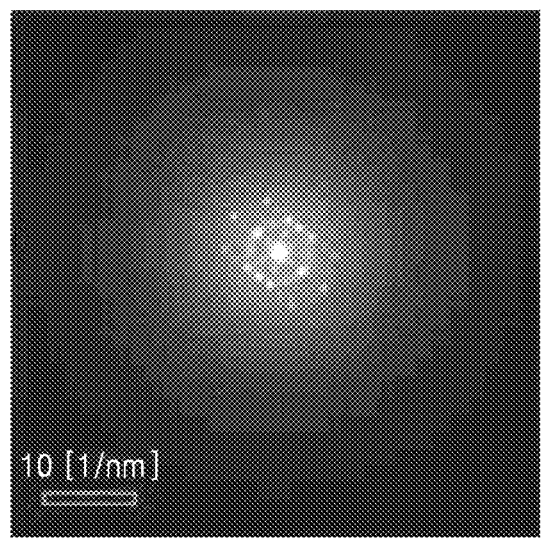

FIGS. 6B to 6D are each an enlarged view showing A1, A2, and A3 regions of FIG. 6A. As shown in FIG. 6A, an amorphous film was formed on the surface of the solid electrolyte, and a garnet-structured crystalline phase layer was formed inside the amorphous film (see FIG. 6C). In addition, the presence of a semi-crystalline phase film was observed between the amorphous film and the crystalline phase layer (see FIG. 6B).

Evaluation Example 4

Electrochemical Performance

The Li-deposition/stripping test was performed on the lithium symmetric cells of Example 14 and Comparative Example 4 by using a constant current method for every 1 hour. The electrochemical performance of the lithium symmetric cells of Example 14 and Comparative Example 4 was tested as current density was increased stepwise from 0.2 milliampere per square centimeter (mA/cm$^2$) to 1.8 mA/cm$^2$, and the results are shown in FIGS. 7A and 7B.

Figure 7A:
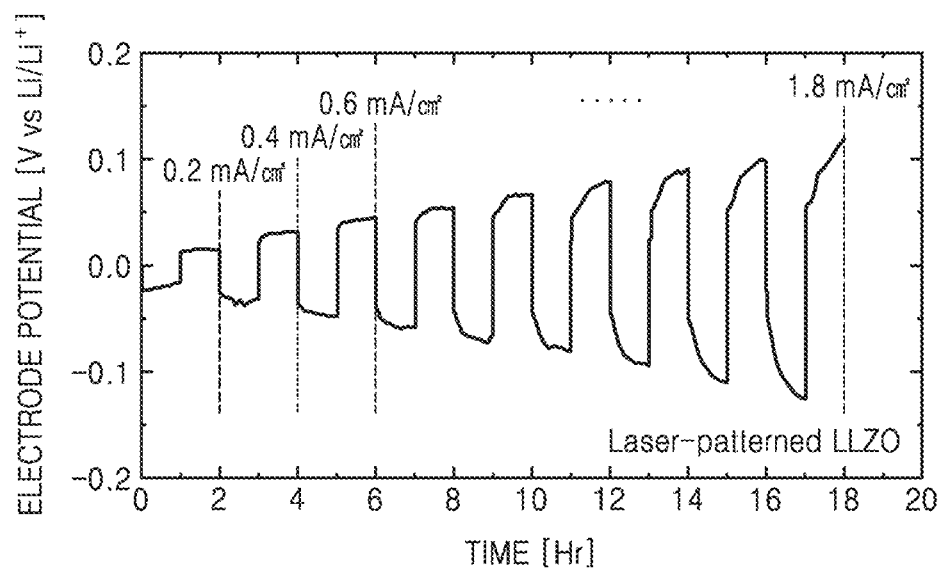
FIGS. 7A and 7B are each a graph of electrode potential (Volts vs Li/Li$^+$) versus time (hours) showing results of an electrochemical performance test of a lithium symmetric cell prepared according to Example 14 and Comparative Example 4.
Figure 7B:
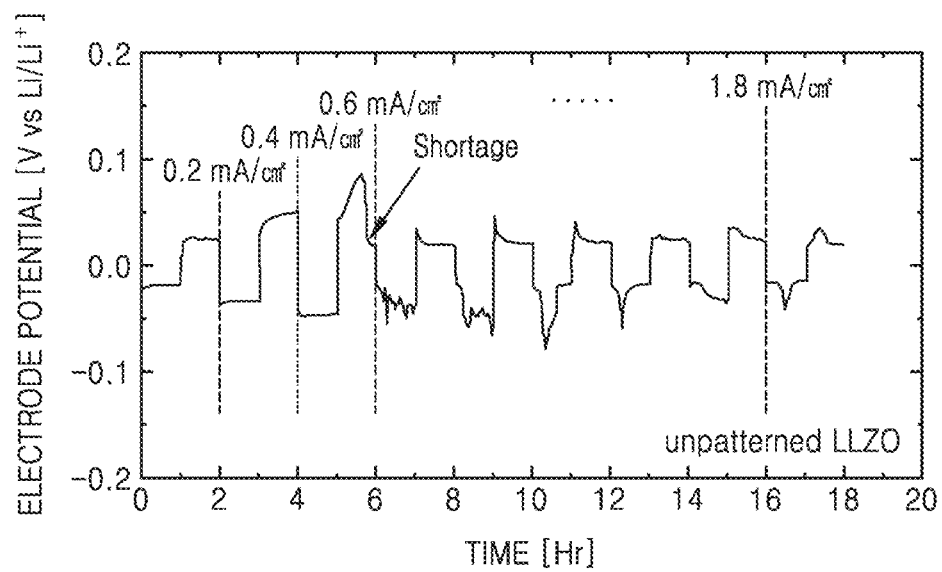

Referring to FIGS. 7A and 7B, shortage signals were observed at 0.6 mA/cm$^2$ in the lithium symmetric cell of Comparative Example 4 (unpatterned-LLZO). However, it was confirmed that the lithium symmetric cell of Example 14 (laser-patterned LLZO) was more stable against shorting, without shortage until reaching 1.8 mA/cm$^2$.

Evaluation Example 5

Interfacial Resistance

Regarding the lithium metal batteries of Example 9 and Comparative Example 3, an impedance analyzing device (Solartron 1260A Impedance/Gain-Phase Analyzer) was used to measure resistance at a temperature of 25° C. according to the 2-probe method. The conditions included an amplitude of ±10 millivolts (mV) and a frequency range from 0.1 Hz to 1 MHz. Nyquist plots of the impedance measurement results obtained at 24-hour elapsed time after the preparation of the lithium metal batteries of Example 9 and Comparative Example 3 were shown in FIGS. 9A and 9B, respectively.

Figure 9A:
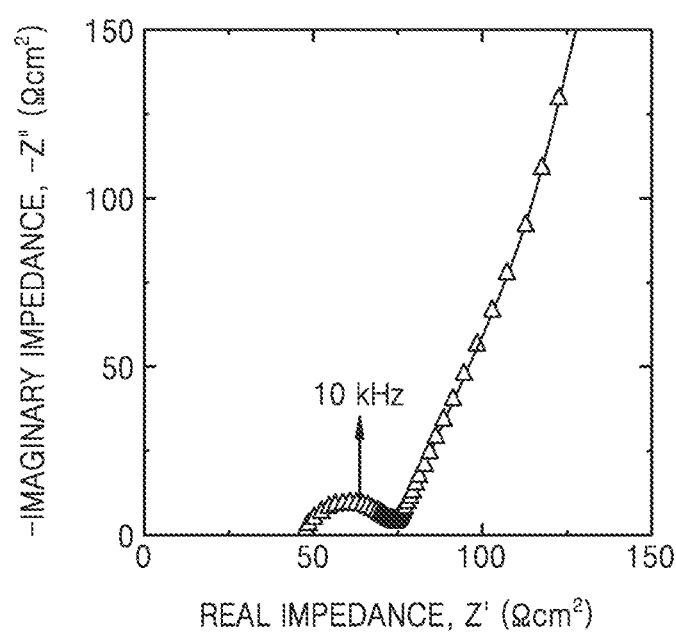
FIGS. 9A and 9B are each a graph of imaginary impedance ($\Omega cm^2$) versus real impedance ($\Omega cm^2$) showing interfacial resistance characteristics of lithium metal batteries prepared according to Example 9 and Comparative Example 3, respectively.
Figure 9B:
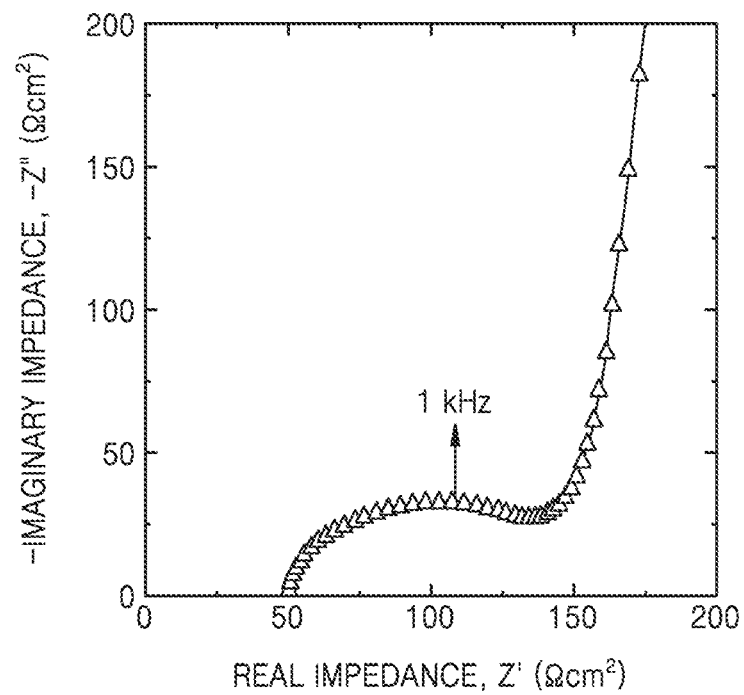

Referring to FIGS. 9A and 9B, it was confirmed that, as a result of the impedance measurement, the overall interfacial resistance of the cell was reduced from about 100 square centimeters (Ωcm$^2$) to about 25 Ωcm$^2$ upon the laser patterning. Such reduction of the overall interfacial resistance was believed to be caused by the increased active area associated with the Li deposition/stripping reactions upon the laser patterning.

Evaluation Example 6

Charge/Discharge Characteristics

Lithium Metal Batteries (Hybrid Electrolyte Cells) of Example 9 and Comparative Example 3

The charge/discharge characteristics of the lithium metal batteries of Example 9 and Comparative Example 3 were evaluated as follows. A charge/discharge cycle was driven at a current density of 0.3 mA/cm$^2$.

For the first charge/discharge of the lithium metal battery of Example 9, the cell was charged with a constant current of 0.1 C until a voltage thereof reached 4.1 V, and maintained at a constant voltage until a current thereof reached 0.05 C. Once the cell charging was completed, after a quiet (open circuit) period of about 10 minutes, constant current discharge was performed thereon with a constant current of 0.1 C until a voltage thereof reached 3 V. For the second charge/discharge cycle, the cell was charged with a constant current of 0.2 C until a voltage thereof reached 4.1 V, and maintained at a constant voltage until a current thereof reached 0.05 C. Once the cell charging was completed, after a rest period of about 10 minutes, constant current discharge was performed with a constant current of 0.2 C until a voltage thereof reached 3 V.

When the cell was charged with a constant current of 1 C until a voltage thereof reached 4.1 V, and maintained at a constant voltage until a current thereof reached 0.05 C, the lifespan evaluation was performed thereon. Once the cell charging was completed, after a rest period of about 10 minutes, constant current discharge was performed thereon with a constant current of 1 C until a voltage thereof reached 3 V, and such a cycle was repeatedly performed for the evaluation.

Figure 10A:
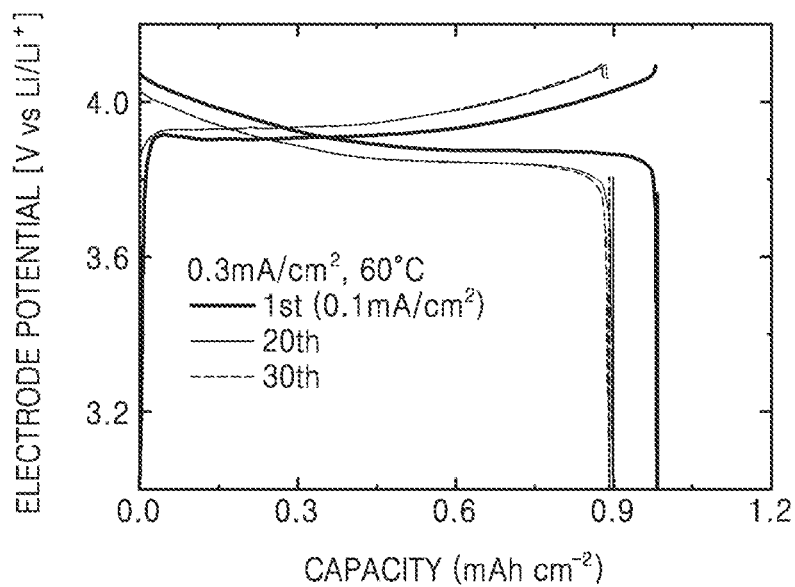
FIGS. 10A and 10B are each a graph of electrode potential (Volts vs Li/Li$^+$) versus capacity (milliampere hours per square centimeter, mAh·cm$^2$) showing capacity-dependent electrode potential changes of a lithium metal battery prepared according to Example 9 and a lithium metal battery prepared according to Comparative Example 3, respectively.
Figure 10B:
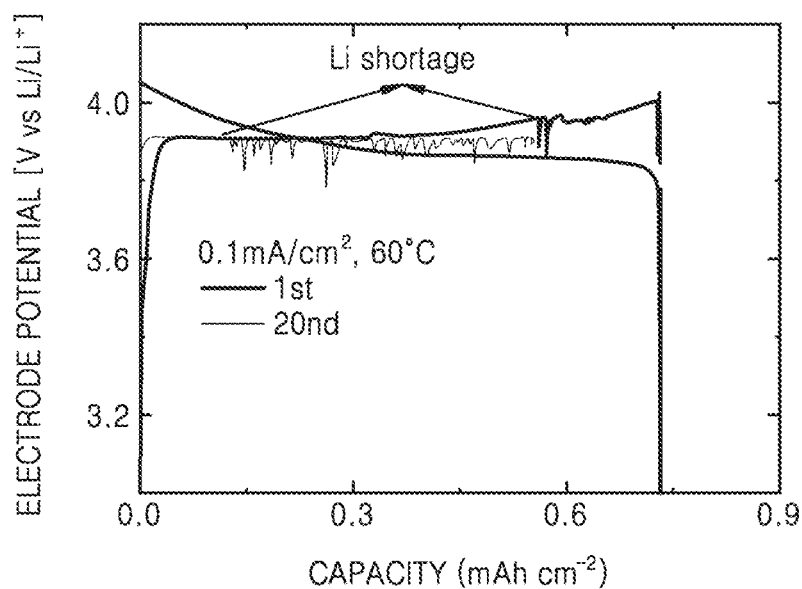
Figure 11:
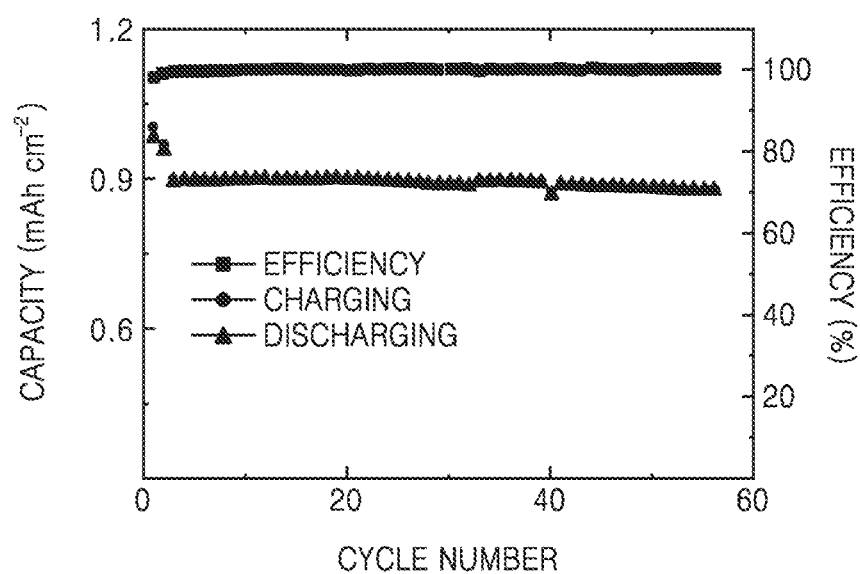
FIG. 11 is a graph of capacity (mAh·cm$^{-2}$) and efficiency (percent) versus cycle number showing capacity changes and efficiency characteristics of a lithium metal battery prepared according to Example 9.

The results of the evaluation of the charge/discharge characteristics are shown in FIGS. 10A, 10B, and FIG. 11. FIGS. 10A and 10B show results regarding characteristics of capacity-dependent electrode potential changes of the lithium metal batteries of Example 9 and Comparative Example 3, respectively.

FIG. 11 shows results regarding capacity changes and efficiency characteristics of the lithium metal battery of Example 9.

Referring to FIG. 10B, it was confirmed that, when the cell including the laser-untreated LLZO (Comparative Example 3) was charged/discharged using a current density of 0.3 mA/cm$^2$ according to the galvanostatic method, voltage noise caused by Li shortage was observed during the 1$^{st}$ and the 2$^{nd}$ charge cycles.

However, it was confirmed that, when the cell including the laser-treated LLZO (Example 9) was charged/discharged, as shown in FIG. 10A, the charge/discharge cycle was driven without shortage upon Li penetration. In addition, as shown in FIG. 11, when charged/discharged over 50 cycles, the cell showed high capacity retention rate and efficiency characteristics. That is, it was confirmed that the surface of the amorphous film formed by the laser patterning had effectively prevented the growth and propagation of Li ions through a grain boundary during charge/discharge of the cell.

Lithium Metal Battery of Example 15

In the same manner as in the evaluation of the charge/discharge characteristics of the lithium metal batteries of Examples 9, charge/discharge characteristics of the lithium metal battery of Example 15 were evaluated. A charge/discharge cycle was driven at a current density of 0.5 mA/cm$^2$.

Figure 14:
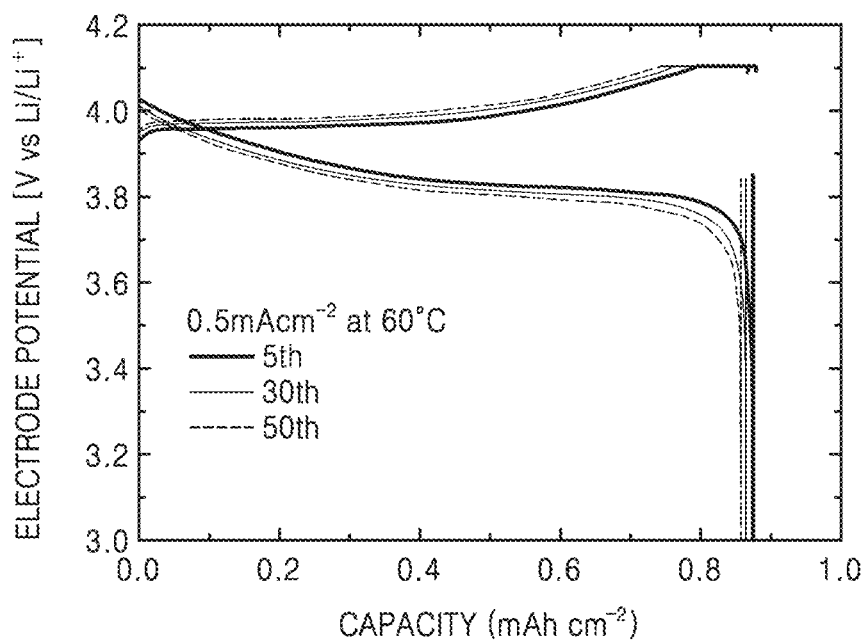
FIG. 14 is a graph of electrode potential (volts vs Li/Li$^+$) versus capacity (mAh·cm$^{-2}$) showing capacity-dependent electrode potential changes of a lithium metal battery prepared according to Example 15.
Figure 15:
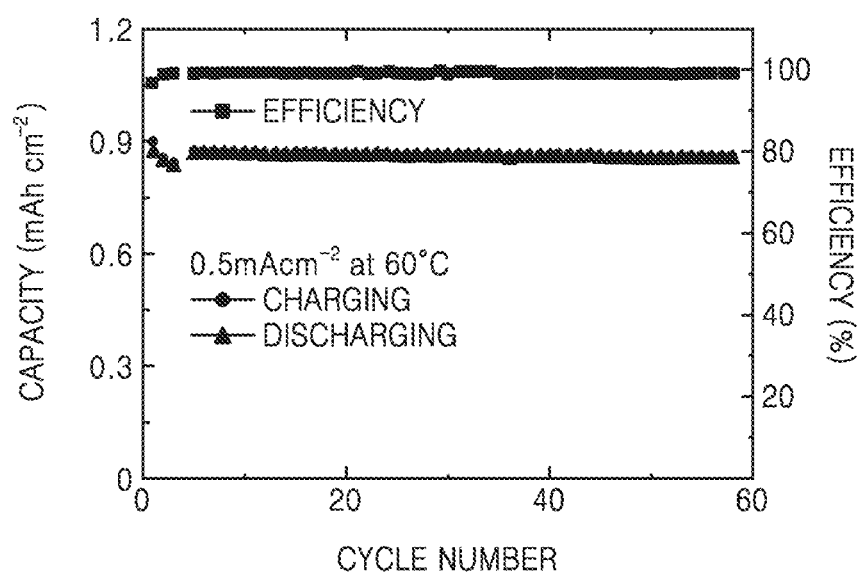
FIG. 15 is a graph of capacity (mAh·cm$^{-2}$) and efficiency (percent) versus cycle number showing capacity changes and efficiency characteristics of a lithium metal battery prepared according to Example 15.

The evaluation results are shown in FIGS. 14 and 15.

FIG. 14 shows results regarding characteristics of capacity-dependent electrode potential changes of the lithium metal battery of Example 15, and FIG. 15 shows capacity changes and efficiency characteristics of the lithium metal battery of Example 15.

Referring to FIGS. 14 and 15, it was confirmed that the lithium metal battery prepared according to Example 15 had excellent electrode potential, capacity retention rate, and efficiency characteristics when using a current density of 0.5 mA/cm$^2$.

Evaluation Example 7

Ion Conductivity

1) Ion Conductivity at Room Temperature (25° C.)

The ion conductivity of the solid electrolytes of Example 4 and Comparative Example 1 was examined at room temperature (25° C.). The solid electrolyte was placed between two stainless steel plates, and an impedance analyzer was connected thereto to measure alternating current impedance. The results are shown in Table 3.

TABLE 3

| | Ion conductivity at 25° C. (Siemens per centimeter (Scm$^{-1}$)) |
|---|---|
| Example 4 | 2.5 × 10$^{-4}$ |
| Comparative Example 1 | 1 × 10$^{-6}$ |

Referring to Table 3, it was confirmed that the solid electrolyte prepared according to Example 4 had improved ion conductivity at room temperature compared to the solid electrolytes prepared according to Comparative Example 1.

2) Ion Conductivity at High Temperature (60° C.)

The ion conductivity of the solid electrolytes of Example 4, Examples 4a and Example 4b was examined at high temperature (60° C.). The solid electrolyte was placed between two stainless steel plates, and an impedance analyzer was connected thereto to measure alternating current impedance. The results are shown in Table 4.

TABLE 4

| | Ion conductivity at 60° C. (Scm$^{-1}$) |
|---|---|
| Example 4 | 1.16 × 10$^{-3}$ |
| Example 4a | 1.2 × 10$^{-3}$ |
| Example 4b | 1.4 × 10$^{-3}$ |

Referring to Table 4, it was confirmed that the solid electrolytes prepared according to Example 4, Example 4a, and Example 4b had improved ion conductivity at high temperature.

Evaluation Example 8

X-Ray Diffraction Analysis of the LLZO Films Obtained According to Examples 3c to 3e was Carried Out As a result of X-ray diffraction analysis on each LLZO film, the mixing ratio of each phase was examined, and the results are shown in Table 5 below

TABLE 5

| | Composition |
|---|---|
| Example 3c | 95 weight percent (wt %) cubic garnet<br>2 wt % La$_2$Zr$_2$O$_7$<br>2 wt % cubic La$_2$O$_3$<br>1 wt % W$_3$O$_8$ |
| Example 3d | 97 wt % cubic phase<br>3 wt % La$_2$Zr$_2$O$_7$ |
| Example 3e | 99.5 wt % cubic phase<br>0.5 wt % La$_2$Zr$_2$O$_7$ |

As described above, according to an embodiment, a solid electrolyte for a lithium metal battery is surface-treated with a laser beam so that an active area of the solid electrolyte increases, and an amorphous film is formed on a surface of the solid electrolyte. In this regard, when such the solid electrolyte is used, interfacial resistance between the solid electrolyte and a lithium metal negative electrode may be reduced, and growth and propagation of lithium ions in the solid electrolyte may be efficiently suppressed.

It should be understood that embodiments described herein should be considered in a descriptive sense only and not for purposes of limitation. Descriptions of features, advantages, or aspects within each embodiment should typically be considered as available for other similar features, advantages, or aspects in other embodiments.

While an embodiment has been described with reference to the figures, various changes in form and details may be made without departing from the scope as defined by the following claims.

What is claimed is:

1. A solid electrolyte, comprising:
    a lithium ion inorganic conductive layer;
    an amorphous phase film on the lithium ion inorganic conductive layer, wherein a surface of the amorphous phase film includes a line pattern in a form of a mesh,
    a semi-crystalline film situated between the lithium ion inorganic conductive layer and the mesh-patterned amorphous phase film; and
    a crystalline phase situated between the semi-crystalline film and the line patterned mesh-patterned amorphous phase film,
    wherein the mesh-pattern has a pattern size of about 10 μm to about 10,000 μm, and the pattern width is in a range of about 1 μm to about 150 μm.

2. The solid electrolyte of claim 1, wherein the mesh-patterned amorphous phase film has a thickness of about 5 nanometers to about 5 micrometers, the semi-crystalline film has a thickness of about 2 nanometers to about 3 micrometers, and a thickness ratio of the mesh-patterned amorphous phase film to the semi-crystalline film is in a range of about 1:0.2 to about 1:0.8.

3. The solid electrolyte of claim 1, wherein the crystalline phase is in the form of a crystalline film.

4. The solid electrolyte of claim 1, wherein the mesh-patterned amorphous phase film has a surface area of about 200 percent to about 500 percent greater than a surface area of the lithium ion inorganic conductive layer beneath the mesh-patternedline amorphous phase film.

5. The solid electrolyte of claim 1, further comprising at least one of a ceramic layer or a ceramic glass layer on an unpatterned surface of the lithium ion inorganic conductive layer.

6. The solid electrolyte of claim 1, wherein the lithium ion inorganic conductive layer comprises at least one of a garnet compound, an argyrodite compound, a lithium super ionic conductor, a sodium super ionic conductor, lithium nitride, lithium hydride, a compound having a perovskite structure, or a lithium halide.

7. The solid electrolyte of claim 1, wherein the lithium ion inorganic conductive layer comprises at least one of:
    a garnet ceramic of the formula Li$_{3+x}$La$_3$M$_2$O$_{12}$ wherein 0≤x≤5, and M is tellurium, niobium, or zirconium,
    Li$_{1+x+y}$Al$_x$Ti$_{2-x}$Si$_y$P$_{3-y}$O$_{12}$ wherein 0<x<2 and 0≤y<3,
    BaTiO$_3$,
    Pb(Zr$_{1-x}$Ti$_x$)O$_3$ wherein 0<x<1,
    Pb$_{1-x}$La$_x$Zr$_{1-y}$Ti$_y$O$_3$ wherein 0≤x<1 and 0≤y<1,
    Pb(Mg$_{1/3}$Nb$_{2/3}$)O$_3$—PbTiO$_3$,
    Li$_3$PO$_4$,
    Li$_x$Ti$_y$(PO$_4$)$_3$ wherein 0<x<2 and 0<y<3,
    Li$_x$Al$_y$Ti$_z$(PO$_4$)$_3$ wherein 0<x<2, 0<y<1, and 0<z<3,
    Li$_{1+x+y}$(Al$_a$Ga$_{1-a}$)$_x$(Ti$_b$Ge$_{1-b}$)$_{2-x}$Si$_y$P$_{3-y}$O$_{12}$ wherein 0≤x≤1, 0≤y≤1, 0≤a≤1, and 0≤b≤1,
    Li$_x$La$_y$TiO$_3$ wherein 0<x<2 and 0<y<3,
    Li$_x$Ge$_y$P$_z$S$_w$ wherein 0<x<4, 0<y<1, 0<z<1, and 0<w<5,
    Li$_x$N$_y$ wherein 0<x<4 and 0<y<2,
    a glass of the formula Li$_x$Si$_y$S$_z$ glass wherein 0≤x<3, 0<y<2, and 0<z<4,
    a glass of the formula Li$_x$P$_y$S$_z$ glass wherein 0≤x<3, 0<y<3, and 0<z<7,
    Li$_{3x}$La$_{2/3-x}$TiO$_3$ wherein 0≤x≤⅙, $Li_{1+y}Al_yTi_{2-y}(PO_4)_3$ wherein $0 \leq x \leq 1$,
$Li_{1+z}Al_zGe_{2-z}(PO_4)_3$ wherein $0 \leq x \leq 1$,
$Li_2O$, LiF, LiOH, $Li_2CO_3$, $LiAlO_2$, a $(Li_2O)_a$—$(Al_2O_3)_b$—$(SiO_2)_c$—$(P_2O_5)_d$—$(TiO_2)_e$—$(GeO_2)_f$ ceramic wherein $0 \leq a \leq 1$, $0 \leq b \leq 1$, $0 \leq c \leq 1$, $0 \leq d \leq 1$, $0 \leq e \leq 1$, and $0 \leq f \leq 1$, $Li_{10}GeP_2S_{12}$, $Li_3PS_4$, $Li_6PS_5Br$, $Li_6PS_5Cl$, $Li_7PS_5$, $Li_6PS_5I$, $LiTi_2(PO_4)_3$, $LiGe_2(PO_4)_3$, $LiHf_2(PO_4)_3$, $LiZr_2(PO_4)_3$, $Li_2NH_2$, $Li_3(NH_2)_2I$, $LiBH_4$, $LiAlH_4$, $LiNH_2$, $Li_{0.34}La_{0.51}TiO_{2.94}$, $LiSr_2Ti_2NbO_9$, $Li_{0.06}La_{0.66}Ti_{0.93}Al_{0.03}O_3$, $Li_{0.34}Nd_{0.55}TiO_3$, $Li_2CdCl_4$, $Li_2MgCl_4$, $Li_2ZnI_4$, and $Li_2CdI_4$.

8. The solid electrolyte of claim 7, wherein a crystallinity of the lithium ion inorganic conductive layer increases in a direction away from the mesh-patterned amorphous phase film.

9. The solid electrolyte of claim 1, wherein the lithium ion inorganic conductive layer comprises at least one compound selected from a compound of Formula 1 or a compound of Formula 1a:

Formula 1

$$Li_{7-x}M^1_xLa_{3-a}M^2_aZr_{2-b}M^3_bO_{12}, \text{ and} \qquad \text{Formula 1}$$

$$Li_{7-x}La_{3-a}M^2_aZr_{2-b}M^3_bO_{12}, \qquad \text{Formula 1a}$$

wherein, in Formula 1, $M^1$ comprises at least one of gallium and aluminum, in Formulas 1 and 1a, $M^2$ comprises at least one of calcium, strontium, cesium, and barium, M3 comprises at least one of aluminum, tungsten, niobium, and tantalum, and $0 \leq x < 3$, $0 \leq a \leq 3$, and $0 \leq b < 2$.

10. The solid electrolyte of claim 9, wherein the crystalline phase is in a form of a crystalline film,
wherein if present, the $M^1$, $M^2$, and $M^3$ of Formulas 1 and 1a are dopants, and
wherein a total content of the dopant in the mesh-patterned amorphous phase film is less than a total content of the dopant in the crystalline film.

11. The solid electrolyte of claim 9, wherein at least one of $M^1$, $M^2$, or $M^3$ of Formulas 1 and 1 a is present and are dopants, and
wherein a total content of the dopant in the amorphous phase is equal to or less than 1 mole percent, based on 100 mole percent of the mesh-patterned amorphous phase film.

12. The solid electrolyte of claim 9, wherein the compound of Formula 1 is at least one of $Li_{4.9}La_{2.5}Ca_{0.5}Zr_{1.7}Nb_{0.3}O_{12}$, $Li_{4.9}Ga_{0.5+\delta}La_3Zr_{1.7}W_{0.3}O_{12}$ wherein $0 \leq \delta \leq 1.6$, $Li_{6.4}La_3Zr_{1.7}W_{0.3}O_{12}$, $Li_7La_3Zr_{1.5}W_{0.5}O_{12}$, $Li_7La_{2.75}Ca_{0.25}Zr_{1.75}Nb_{0.25}O_{12}$, $Li_7La_3Zr_{1.5}Nb_{0.5}O_{12}$, $Li_7La_3Zr_{1.5}Ta_{0.5}O_{12}$, $Li_{6.272}La_3Zr_{1.7}W_{0.3}O_{12}$, or $Li_{5.39}Ga_{0.5+\delta}La_3Zr_{1.7}W0.3O_{12}$ wherein $03 \leq \delta \leq 1.1$.

13. The solid electrolyte of claim 1, wherein the lithium ion inorganic conductive layer is a crystalline film having a crystal grain boundary, and
wherein a thickness ratio of the lithium ion inorganic conductive layer to the mesh-patterned amorphous phase film is from 1:0.001 to 1:0.2.

14. The solid electrolyte of claim 1, wherein ion conductivity at 60° C. of the solid electrolyte is in a range of about $5 \times 10^{-4}$ Siemens per centimeter or greater.

15. The solid electrolyte of claim 1, wherein the solid electrolyte has ionic conductivity at 25° C. of $1 \times 10^{-7}$ Siemens per centimeter to $5 \times 10^{-3}$ Siemens per centimeter.

16. The solid electrolyte of claim 1, wherein the solid electrolyte is a liquid-impermeable layer having a porosity of 30% or less, and a thickness of the solid electrolyte is about 1 micrometer to about 300 micrometers.

17. The solid electrolyte of claim 1, wherein the mesh-patterned amorphous film comprises a plurality of grooves that forms the mesh pattern.

18. The solid electrolyte of claim 17, wherein a depth of a groove of the plurality of grooves is in a range from about 0.1 μm to about 20 μm, and a width of the groove of the plurality of grooves is about 1-10 μm to about 200-100 μm.

19. The solid electrolyte of claim 1, wherein the mesh-patterned amorphous phase film is a product of ultraviolet laser irradiation of the lithium ion inorganic conductive layer, and the semi-crystalline film is a product of melt quenching.

20. The solid electrolyte of claim 1, wherein the semi-crystalline film is a product of melt quenching.

21. The solid electrolyte of claim 1, wherein a surface of the mesh-patterned amorphous phase film does not comprise a grain boundary.

22. The solid electrolyte of claim 1, wherein the lithium ion inorganic conductive layer comprises at least one compound selected from a compound of Formula 1 and a compound of Formula 1a:

$$Li_{7-x}M^1_xLa_{3-a}M^2_aZr_{2-b}M^3_bO_{12}, \text{ and} \qquad \text{Formula 1}$$

$$Li_{7-x}La_{3-a}M^2_aZr_{2-6}M^3_bO_{12}, \qquad \text{Formula 1a}$$

wherein, in Formula 1, $M^1$ comprises at least one of gallium and aluminum, in Formulas 1 and 1a,
$M^2$ comprises at least one of calcium, strontium, cesium, and barium,
$M^3$ comprises at least one of aluminum, tungsten, niobium, and tantalum, and $0 \leq x < 3$, $0 \leq a \leq 3$, and $0 < b < 2$, and
wherein the $M^1$, $M^2$, and $M^3$ of Formulas 1 and 1a are dopants, and wherein a content of the dopant at a grain boundary is greater than a content of the dopant content in a grain of the solid electrolyte.

23. The solid electrolyte of claim 1,
wherein the lithium ion inorganic conductive layer comprises a dopant, and a content of the dopant at a grain boundary of the lithium ion inorganic conductive layer is greater than that of the dopant in a grain of the lithium ion inorganic conductive layer.

24. A lithium battery comprising:
a negative electrode;
a positive electrode; and
the solid electrolyte of claim 1.

25. The lithium battery of claim 24, wherein the mesh-patterned amorphous phase film of the solid electrolyte is adjacent to the negative electrode.

26. The lithium battery of claim 24, wherein the mesh-patterned amorphous phase film of the solid electrolyte is adjacent to the positive electrode.

27. The lithium battery of claim 24, wherein the negative electrode is a lithium metal negative electrode comprising lithium metal or an alloy of lithium metal, and the lithium battery further comprises an interlayer between the lithium metal negative electrode and the solid electrolyte.

28. The lithium battery of claim 27, wherein a thickness of the interlayer is about 1 micrometer to about 10 micrometers.

29. The lithium battery of claim 28, wherein the interlayer comprises at least one of polyethylene oxide, gold, aluminum oxide, lithium aluminate, zinc, silicon, and lithium phosphate.

30. The lithium battery of claim 24, wherein the negative electrode is a lithium metal negative electrode comprising lithium metal or a lithium metal alloy.

31. The lithium battery of claim 30, wherein the lithium metal negative electrode further comprises a protective layer.

32. The lithium battery of claim 30, wherein an interfacial resistance between the lithium metal negative electrode and the solid electrolyte is about 10 ohm cm$^2$ to about 500 ohm cm$^2$.

33. The solid electrolyte of claim 1, wherein the mesh-patterned amorphous phase film has a surface area of about 200 percent to about 500 percent greater than a surface area of the solid electrolyte in which the amorphous phase is not present.

34. The solid electrolyte of claim 33, wherein the mesh-patterned amorphous phase film has a constant thickness when determined in a direction perpendicular to a surface of the lithium ion inorganic conductive layer.

35. The solid electrolyte of claim 1, wherein a content of grain boundaries in the mesh-patterned amorphous phase film is less than a content of grain boundaries in the semi-crystalline film, the lithium ion inorganic conductive layer, or both the semi-crystalline film and the lithium ion inorganic conductive layer.

36. The solid electrolyte of claim 1, wherein the pattern of width is from about 10 micrometers to about 30 micrometers.

37. A solid electrolyte, comprising:
a lithium ion inorganic conductive layer;
an amorphous phase film on a surface of the lithium ion inorganic conductive layer, the amorphous phase film in a form of a pattern, wherein a thickness ratio of the lithium ion inorganic conductive layer to the amorphous phase film is from 1:0.001 to 1:0.2;
wherein the amorphous phase film has a surface area that is about 200 percent to about 500 percent greater than a surface area of the lithium ion inorganic conductive layer;
a semi-crystalline film comprising a semi-crystalline phase, the semi-crystalline film disposed between the lithium ion inorganic conductive layer and the amorphous phase film; and
a crystalline film disposed between the semi-crystalline film and the patterned amorphous film.

38. The solid electrolyte of claim 37, wherein the pattern of the amorphous phase film includes parallel lines or a mesh pattern of lines comprising lines having a line width of from about 10 micrometers to about 30 micrometers.

39. The solid electrolyte of claim 37, wherein the lithium ion inorganic conductive layer comprises at least one compound selected from a compound of Formula 1 or a compound of Formula 1a:

$$Li_{7-x}M^1_xLa_{3-a}M^2_aZr_{2-b}M^3_bO_{12},\text{ and} \qquad \text{Formula 1}$$

$$Li_{7-x}La_{3-a}M^2_aZr_{2-b}M^3_bO_{12}, \qquad \text{Formula a}$$

wherein, in Formula 1, $M^1$ comprises at least one of gallium and aluminum, in Formulas 1 and 1a, $M^2$ comprises at least one of calcium, strontium, cesium, and barium, $M^3$ comprises at least one of aluminum, tungsten, niobium, and tantalum, and $0 \leq x < 3$, $0 \leq a \leq 3$, and $0 < b < 2$.

40. The solid electrolyte of claim 37, wherein the lithium ion inorganic conductive layer is a crystalline film having a crystal grain boundary, and the solid electrolyte has an ionic conductivity at 25° C. of $1 \times 10^{-7}$ Siemens per centimeter to $5 \times 10^3$ Siemens per centimeter.

41. The solid electrolyte of claim 37, wherein the pattern of the amorphous phase film comprises a plurality of periodic grooves that are spaced apart, wherein a depth of a groove of the plurality of grooves is in a range from about 0.1 μm to about 20 82 m, and a width of the groove of the plurality of grooves is about 1 μm to about 200 μm.

42. A lithium battery comprising:
a negative electrode;
a positive electrode; and
the solid electrolyte of claim 37.

* * * * *